US010088314B2

(12) United States Patent
Nakagawa

(10) Patent No.: US 10,088,314 B2
(45) Date of Patent: Oct. 2, 2018

(54) ANGULAR VELOCITY DETECTION ELEMENT, ANGULAR VELOCITY DETECTION DEVICE, ELECTRONIC APPARATUS, AND MOVING OBJECT

(71) Applicant: Seiko Epson Corporation, Tokyo (JP)

(72) Inventor: Keiji Nakagawa, Minowa (JP)

(73) Assignee: Seiko Epson Corporation (JP)

( * ) Notice: Subject to any disclaimer, the term of this patent is extended or adjusted under 35 U.S.C. 154(b) by 168 days.

(21) Appl. No.: 15/071,689

(22) Filed: Mar. 16, 2016

(65) Prior Publication Data

US 2016/0282118 A1    Sep. 29, 2016

(30) Foreign Application Priority Data

Mar. 23, 2015    (JP) .................................. 2015-059147

(51) Int. Cl.
*G01C 19/5747*    (2012.01)
*G01C 19/5607*    (2012.01)

(52) U.S. Cl.
CPC ................................. *G01C 19/5607* (2013.01)

(58) Field of Classification Search
CPC ................ G01C 19/00; G01C 19/5607; G01C 19/5614; G01C 19/5642; G01C 19/5649; G01C 19/5705; G01C 19/5719; G01C 19/5726; G01C 19/574
See application file for complete search history.

(56) References Cited

U.S. PATENT DOCUMENTS

| 6,490,925 | B2* | 12/2002 | Inoue ................. | G01C 19/5607 |
| | | | | 310/370 |
| 9,379,307 | B2* | 6/2016 | Ogura ................ | G01C 19/5712 |
| 9,683,843 | B2* | 6/2017 | Nakagawa ......... | G01C 19/5628 |
| 2004/0099043 | A1 | 5/2004 | Omawari et al. | |
| 2006/0107739 | A1* | 5/2006 | Ogura ................ | G01C 19/5607 |
| | | | | 73/504.12 |
| 2011/0140575 | A1* | 6/2011 | Nishizawa ......... | G01C 19/5628 |
| | | | | 310/323.21 |
| 2012/0126664 | A1 | 5/2012 | Ogura et al. | |

(Continued)

FOREIGN PATENT DOCUMENTS

| JP | 2002-243451 A | 8/2002 |
| JP | 2012-112748 A | 6/2012 |
| JP | 2013-205329 A | 10/2013 |

*Primary Examiner* — Paul West
*Assistant Examiner* — Mark A Shabman
(74) *Attorney, Agent, or Firm* — Harness, Dickey & Pierce, P.L.C.

(57) ABSTRACT

A gyro element includes a base section, vibrating arms connected to the base section, driving piezoelectric elements disposed on the vibrating arms and causing a flexural vibration in the drive vibration mode of X-axis in-phase and Z-axis inverse-phase, and detecting piezoelectric elements disposed on the vibrating arms and adapted to detect the angular velocity around the detection axis, and in a case of making the vibrating arms flexurally vibrate in the drive vibration mode, signals having respective phases reverse to each other are generated in the detecting piezoelectric elements, and in a case in which the angular velocity is applied while making the vibrating arms flexurally vibrate in the drive vibration mode, signals having respective phases the same as each other are generated in the detecting piezoelectric elements.

20 Claims, 31 Drawing Sheets

(56) References Cited

U.S. PATENT DOCUMENTS

| | | | |
|---|---|---|---|
| 2013/0019681 A1* | 1/2013 | Shimura | G01C 19/5607 |
| | | | 73/504.16 |
| 2013/0221804 A1* | 8/2013 | Ichikawa | G01C 19/5621 |
| | | | 310/323.21 |
| 2013/0255379 A1 | 10/2013 | Nakagawa et al. | |
| 2014/0020503 A1* | 1/2014 | Yamaguchi | G01P 9/04 |
| | | | 74/5 R |
| 2014/0077664 A1* | 3/2014 | Ogura | G01C 19/5712 |
| | | | 310/370 |
| 2014/0290362 A1* | 10/2014 | Nakagawa | G01C 19/5607 |
| | | | 73/504.16 |
| 2015/0114117 A1* | 4/2015 | Nakagawa | G01C 19/5607 |
| | | | 73/504.16 |
| 2015/0268107 A1* | 9/2015 | Nishizawa | G01L 1/162 |
| | | | 310/321 |
| 2015/0276404 A1* | 10/2015 | Nishizawa | G01C 19/5642 |
| | | | 73/504.12 |
| 2016/0123734 A1* | 5/2016 | Nakagawa | G01C 19/5621 |
| | | | 73/504.16 |
| 2016/0123736 A1* | 5/2016 | Nakagawa | G01C 19/5607 |
| | | | 73/504.12 |
| 2016/0126923 A1* | 5/2016 | Nakagawa | H03H 9/21 |
| | | | 310/370 |
| 2016/0126924 A1* | 5/2016 | Nakagawa | H03H 9/21 |
| | | | 331/156 |
| 2016/0282118 A1* | 9/2016 | Nakagawa | G01C 19/5607 |
| 2016/0290802 A1* | 10/2016 | Nakagawa | G01C 19/5607 |
| 2017/0059393 A1* | 3/2017 | Nishizawa | G01C 19/5621 |

* cited by examiner

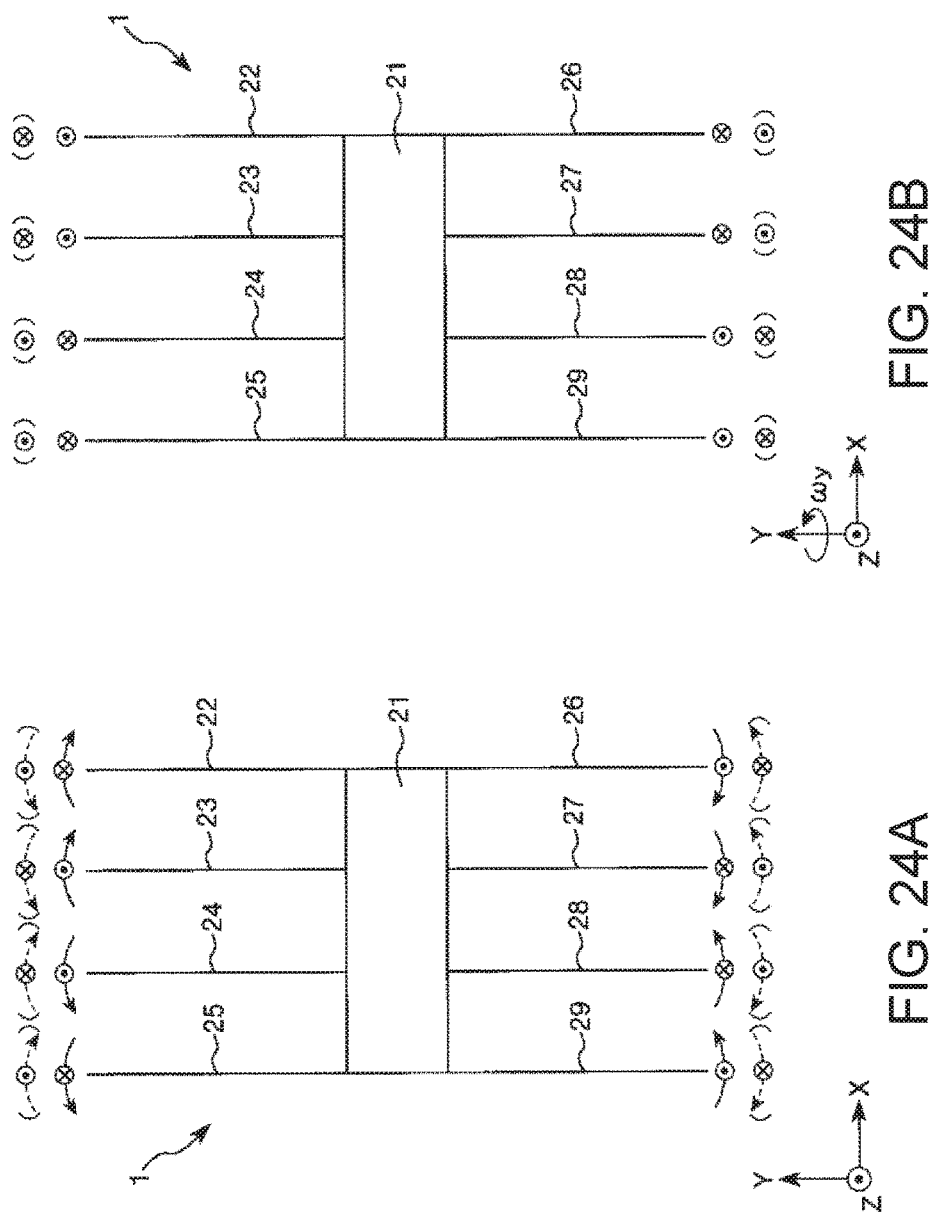

ANGULAR VELOCITY DETECTION ELEMENT, ANGULAR VELOCITY DETECTION DEVICE, ELECTRONIC APPARATUS, AND MOVING OBJECT

BACKGROUND

1. Technical Field

The present invention relates to an angular velocity detection element, an angular velocity detection device, an electronic apparatus, and a moving object.

2. Related Art

In the past, as a gyro element for detecting an angular velocity, there has been known such a gyro element as described in JP-A-2013-205329 (Document 1). The gyro element described in Document 1 has a base section, a pair of drive arms extending from the base section in one direction along a Y axis, and a pair of detection arms extending from the base section in the other direction along the Y axis. In this gyro element, when acceleration around the Y axis is applied in the state in which the pair of drive arms are driven in an X-axis inverse-phase mode, a vibration in a detection vibration mode is excited in the pair of detection arms, and it is possible to detect the angular velocity around the Y axis based on a signal (a charge) generated by the vibration.

Here, it is general for the outer shape of the gyro element to be obtained by patterning a quartz crystal substrate using a photolithography technique and an etching technique. Specifically, by forming masks corresponding to the outer shape on an upper surface and a lower surface of the quartz crystal substrate, and then etching the quartz crystal substrate via the masks, the outer shape of the gyro element can be obtained.

However, in such a method, there is a problem that the masks on the upper and lower sides are shifted, and thus the cross-sectional shapes of the drive arms become different from design shapes. Incidentally, this problem is difficult to avoid in view of the accuracy of a device for forming the masks.

In the gyro element in which the mask displacement has occurred, a vibration in a Z-axis in-phase mode is coupled to the vibration of the X-axis inverse-phase mode in the drive vibration mode, the detection arms vibrate in the Z-axis direction in an unwanted manner due to the vibration in the Z-axis in-phase mode, and noise occurs due to the unwanted vibration.

As described above, in the gyro element of Document 1, there is a problem that the noise cannot be prevented from occurring, and thus the detection accuracy degrades.

SUMMARY

An advantage of some aspects of the invention is to provide an angular velocity detection element, an angular velocity detection device, an electronic apparatus, and a moving object each capable of reducing the degradation of the detection accuracy while inhibiting the noise from occurring.

The invention can be implemented as the following forms or application examples.

Application Example 1

An angular velocity detection element according to this application example includes a base section, at least two vibrating arms connected to the base section, a drive section provided to the two vibrating arms, and adapted to make the two vibrating arms flexurally vibrate in a drive vibration mode in which the vibrations of the vibrating arms are in-phase in an in-plane direction of the base section, and inverse-phase in a thickness direction of the base section, and at least two detection sections provided to each of the two vibrating arms, and adapted to detect an angular velocity around a detection axis, and in a case of making the two vibrating arms flexurally vibrate in the drive vibration mode, signals having respective phases reverse to each other are generated in the two detection sections, and in a case in which an angular velocity around the detection axis is applied while making the two vibrating arms flexurally vibrate in the drive vibration mode, signals having respective phases the same as each other are generated in the two detection sections.

According to this application example, in the drive vibration mode, the signal generated from one of the detection sections and the signal generated from the other of the detection sections are canceled out. Therefore, it is possible to provide an angular velocity detection element capable of inhibiting the noise from occurring, and thus reducing the deterioration of the detection accuracy.

Application Example 2

In the angular velocity detection element according to the application example, it is preferable that the two vibrating arms are tilted so that a distance between the two vibrating arms increases toward a tip side of the vibrating arms.

According to this application example, the contact between the vibrating arms can be reduced.

Application Example 3

In the angular velocity detection element according to the application example, it is preferable that there are included a first vibrating system and a second vibrating system each having the two vibrating arms, and in the drive vibration mode, the two vibrating arms of the first vibrating system and the two vibrating arms of the second vibrating system flexurally vibrate in inverse-phase in the in-plane direction.

According to this application example, it is possible to cancel out the vibrations in the in-plane direction to thereby reduce the vibration leakage.

Application Example 4

In the angular velocity detection element according to the application example, it is preferable that the vibrating arm of the first vibrating system located on the second vibrating system side, and the vibrating arm of the second vibrating system located on the first vibrating system side flexurally vibrate in inverse-phase in the thickness direction of the base section in the drive vibration mode.

According to this application example, the contact between the vibrating arms can be reduced.

Application Example 5

In the angular velocity detection element according to the application example, it is preferable that the drive section includes a piezoelectric element disposed on the vibrating arm.

According to this application example, the configuration of the drive section is simplified.

Application Example 6

In the angular velocity detection element according to the application example, it is preferable that the detection section includes a piezoelectric element disposed on the vibrating arm.

According to this application example, the configuration of the detection section is simplified.

Application Example 7

An angular velocity detection device according to this application example includes the angular velocity detection element according to any one of the application examples described above, and a package adapted to house the angular velocity detection element.

According to this application example, the angular velocity detection device high in reliability can be obtained.

Application Example 8

An electronic apparatus according to this application example includes the angular velocity detection element according to any one of the application examples described above.

According to this application example, the electronic apparatus high in reliability can be obtained.

Application Example 9

A moving object according to this application example includes the angular velocity detection element according to any one of the application examples described above.

According to this application example, the moving object high in reliability can be obtained.

BRIEF DESCRIPTION OF THE DRAWINGS

The invention will be described with reference to the accompanying drawings, wherein like numbers reference like elements.

FIG. 24A is a schematic diagram showing the drive vibration mode, and FIG. 24B is a schematic diagram showing the detection vibration mode.

FIGS. 26A and 26B are diagrams showing an angular velocity detection device as a preferred embodiment of the invention, wherein FIG. 26A is a plan view, and FIG. 26B is a cross-sectional view along the line E-E in FIG. 26A.

DESCRIPTION OF EXEMPLARY EMBODIMENTS

Hereinafter, an angular velocity detection element, an angular velocity detection device, an electronic apparatus, and a moving object according to the invention will be described in detail based on some embodiments shown in the accompanying drawings.

1. Angular Velocity Detection Element

First Embodiment

Figure 1:
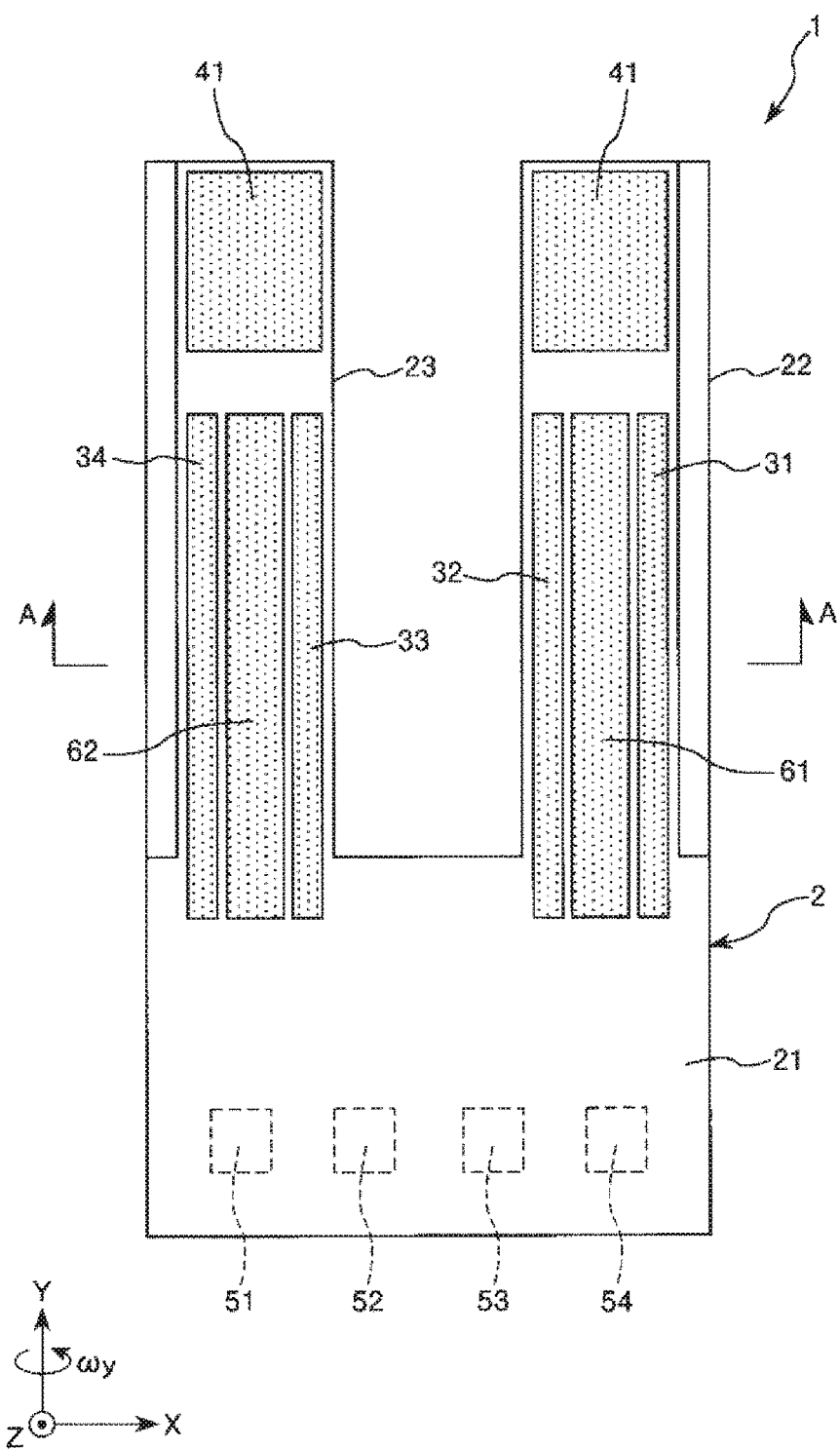
FIG. 1 is a plan view showing a gyro element (an angular velocity detection element) according to a first embodiment of the invention.
Figure 2:
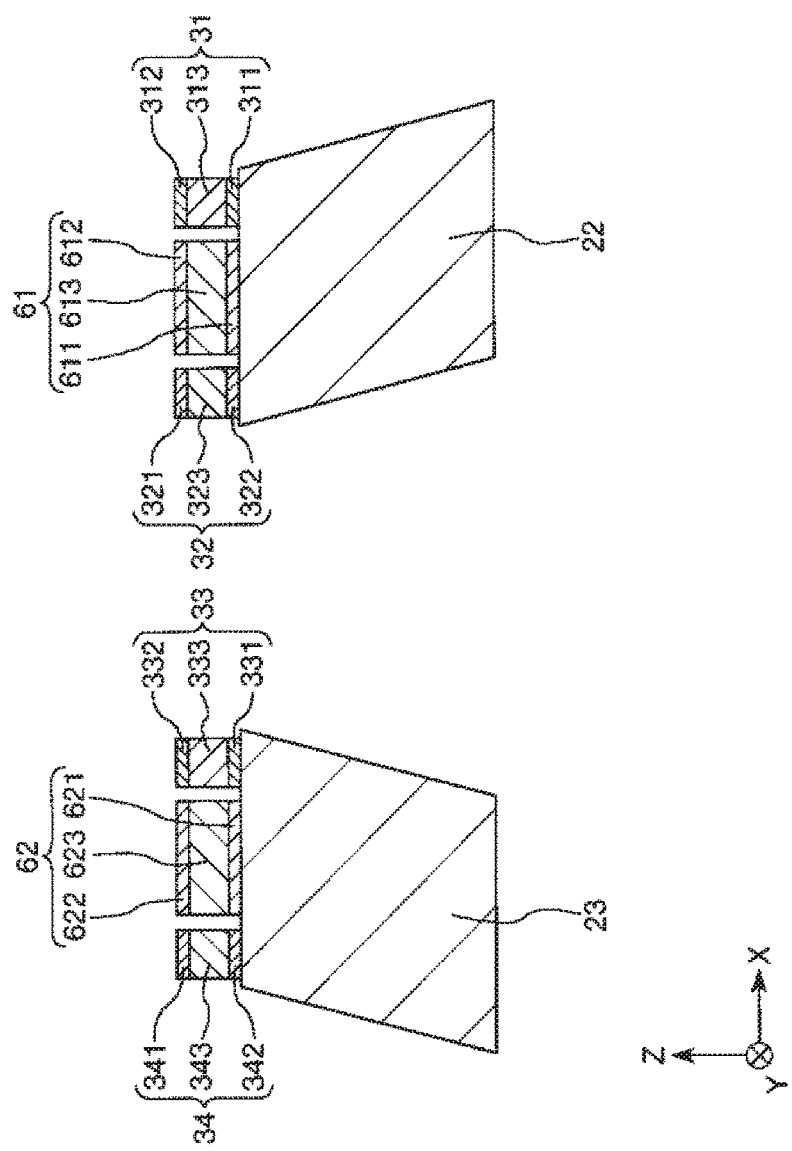
FIG. 2 is a cross-sectional view along the line A-A in FIG. 1.
Figure 3:
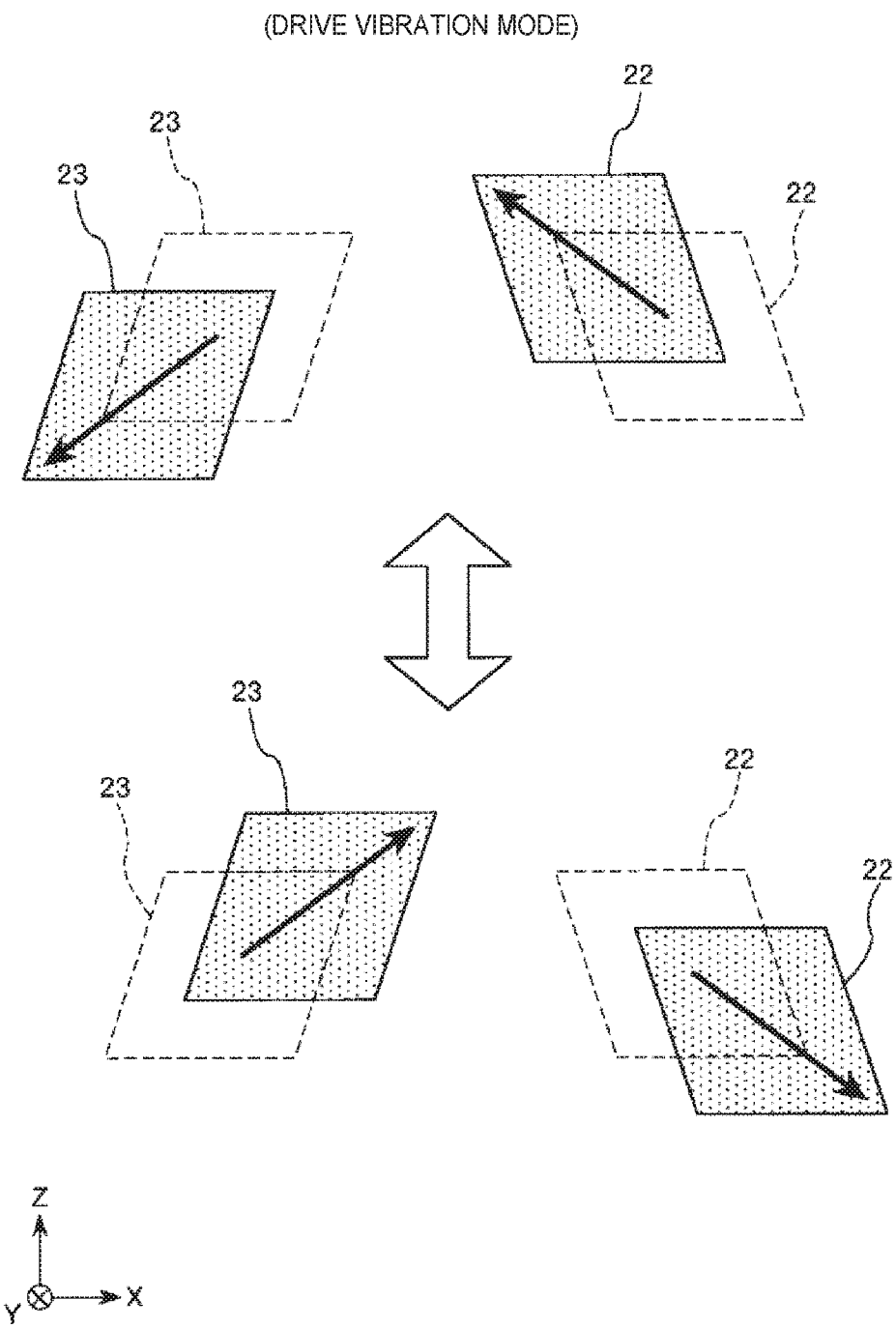
FIG. 3 is a diagram showing a drive vibration mode of the gyro element shown in FIG. 1.
Figure 4:
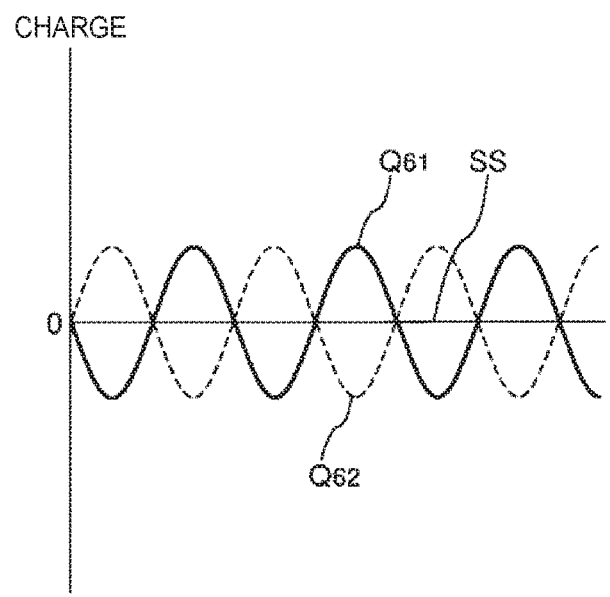
FIG. 4 is a diagram showing a detection signal in the drive vibration mode.
Figure 5A:
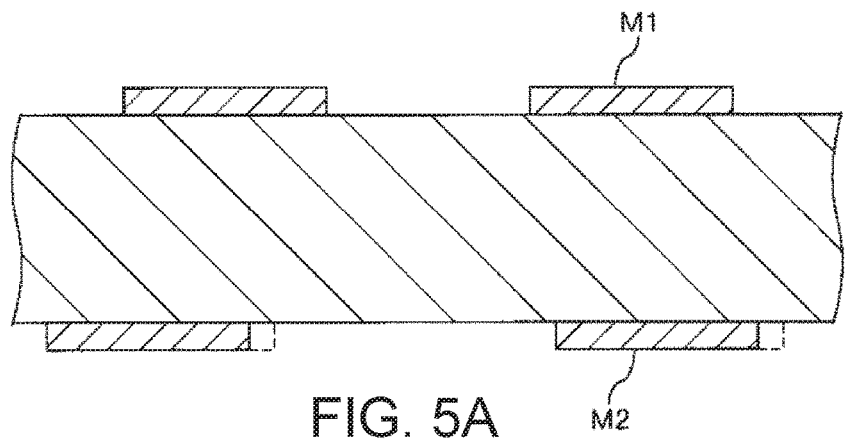
FIGS. 5A through 5C are cross-sectional views for describing the mask displacement caused when manufacturing the gyro element shown in FIG. 1.
Figure 5B:
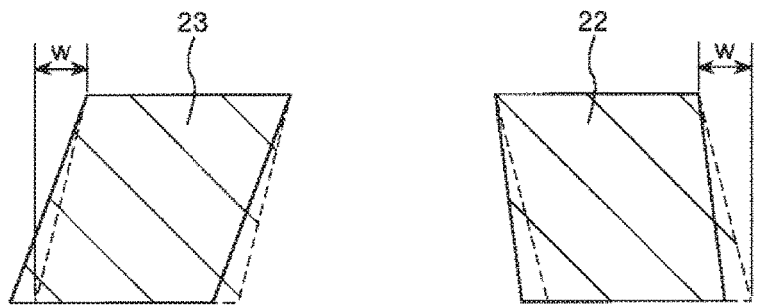
Figure 5C:
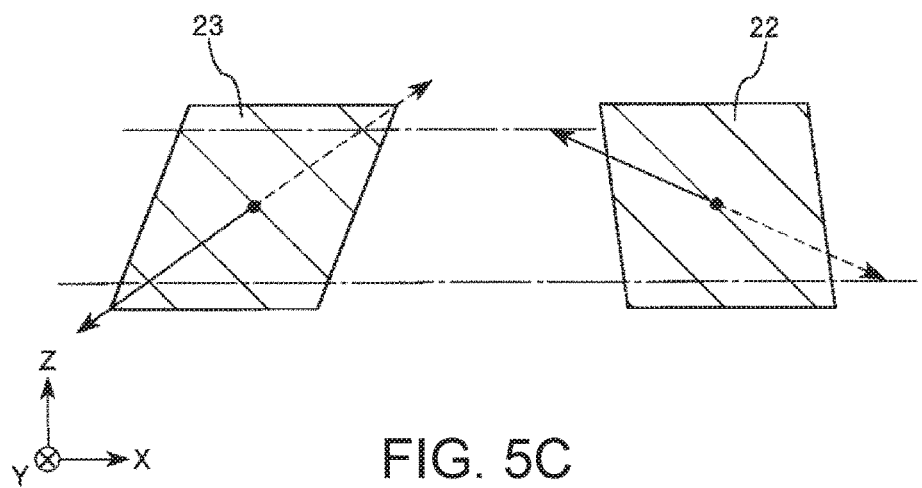
Figure 6:
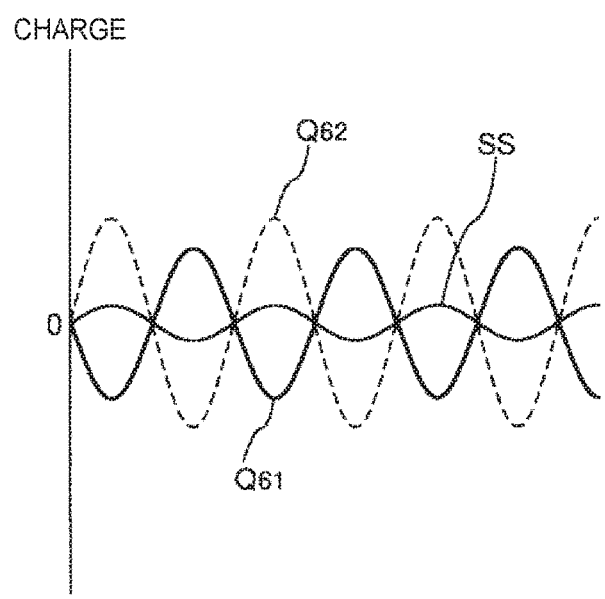
FIG. 6 is a diagram showing a detection signal in the drive vibration mode in the case in which the mask displacement shown in FIGS. 5A through 5C has occurred.
Figure 7A:
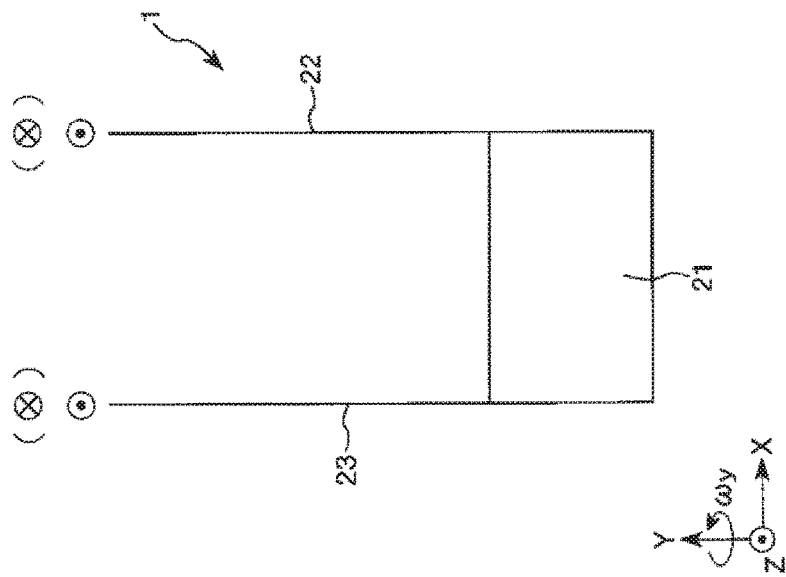
FIG. 7A is a schematic diagram showing the drive vibration mode.
Figure 7B:
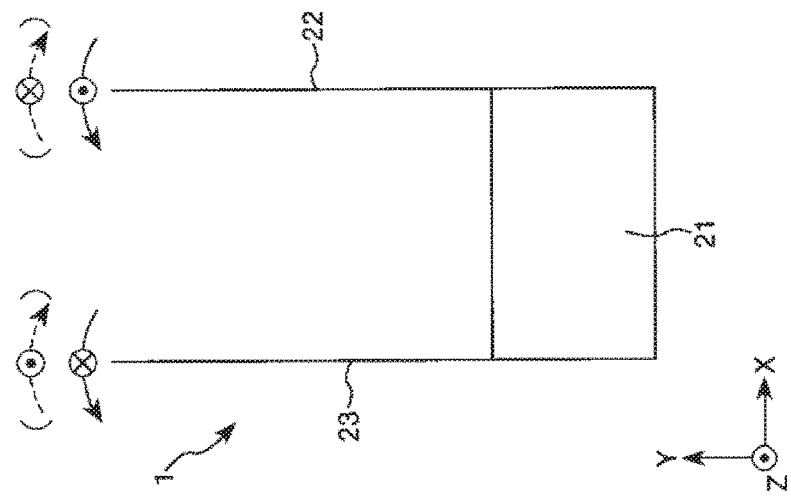
FIG. 7B is a schematic diagram showing a detection vibration mode.
Figure 8:
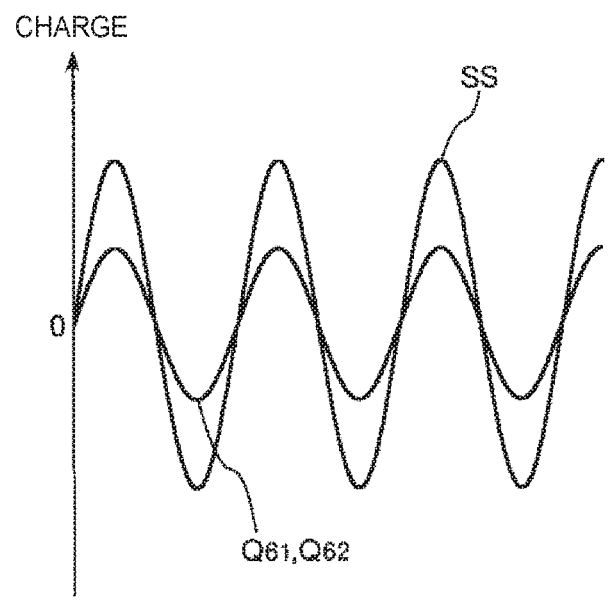
FIG. 8 is a diagram showing a detection signal in the detection vibration mode.
Figure 9A:
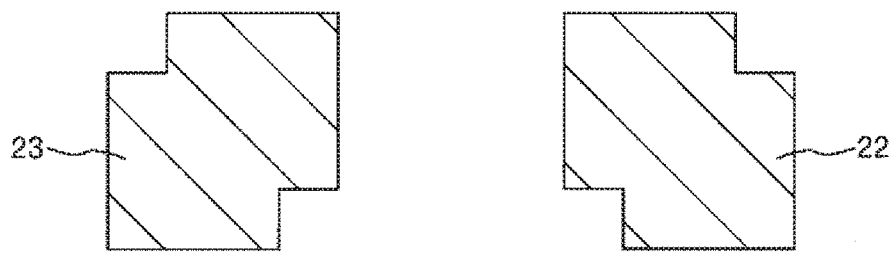
FIGS. 9A through 9C are cross-sectional views each showing a modified example of cross-sectional shapes of vibrating arms.
Figure 9B:
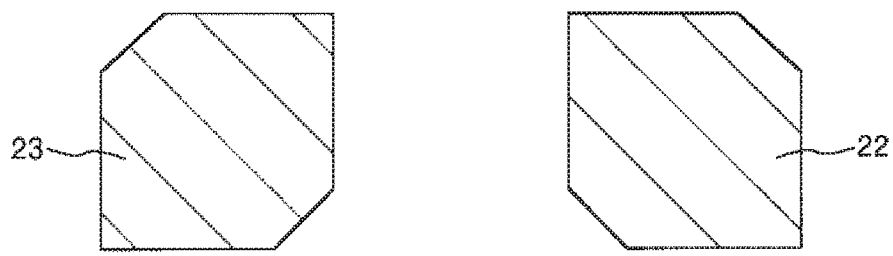
Figure 9C:
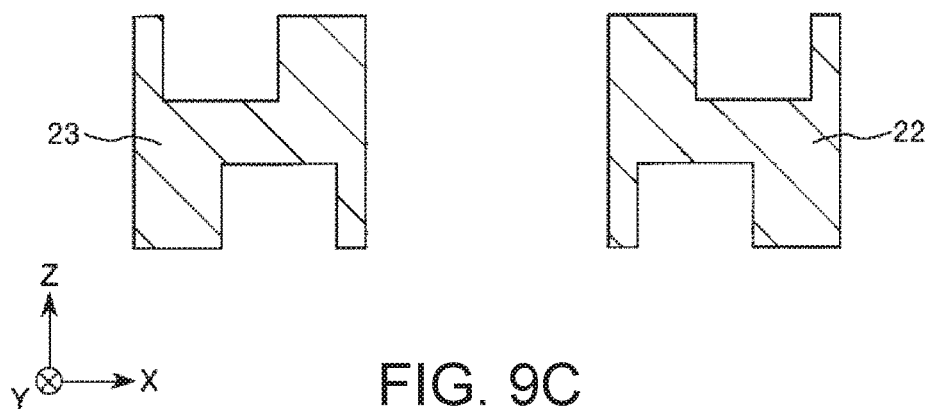

FIG. 1 is a plan view showing a gyro element (an angular velocity detection element) according to a first embodiment of the invention. FIG. 2 is a cross-sectional view along the line A-A in FIG. 1. FIG. 3 is a diagram showing a drive vibration mode of the gyro element shown in FIG. 1. FIG. 4 is a diagram showing a detection signal in the drive vibration mode. FIGS. 5A through 5C are cross-sectional views for describing the mask displacement caused when manufacturing the gyro element shown in FIG. 1. FIG. 6 is a diagram showing a detection signal in the drive vibration mode in the case in which the mask displacement shown in FIGS. 5A through 5C has occurred. FIG. 7A is a schematic diagram showing the drive vibration mode, and FIG. 7B is a schematic diagram showing a detection vibration mode. FIG. 8 is a diagram showing a detection signal in the drive vibration mode. FIGS. 9A through 9C are cross-sectional views each showing a modified example of cross-sectional shapes of vibrating arms. It should be noted that the three axes perpendicular to each other are hereinafter defined as an "X axis," a "Y axis," and a "Z axis," respectively as shown in FIG. 1. Further, the +Z-axis side is also referred to as an "upper side" and the −Z-axis side is also referred to as a "lower side" for the sake of convenience of explanation.

The gyro element (the angular velocity detection element) 1 shown in FIG. 1 is a gyro element capable of detecting the angular velocity ωy around the Y axis. Such a gyro element 1 has a vibrator substrate 2, driving piezoelectric elements (piezoelectric elements) 31, 32, 33, and 34 as a drive section disposed on the vibrator substrate 2, detecting piezoelectric elements (piezoelectric elements) 61, 62 as a detection section, a variety of terminals 51, 52, 53, and 54, and a mass adjustment film 41.

Although a configuration of the gyro element 1 will hereinafter be described in detail, a vibration mode in the state in which an angular velocity ωy is not applied is also referred to as a "drive vibration mode," and a new vibration mode excited by the angular velocity ωy applied during the period in which the gyro element 1 is driven in the drive vibration mode is also referred to as a "detection vibration mode."

The constituent material of the vibrator substrate 2 is not particularly limited providing the material can exert desired vibration characteristics, and a variety of types of piezoelectric material and a variety of types of non-piezoelectric material can be used.

As the piezoelectric material constituting the vibrator substrate 2, there can be used a variety of types of piezoelectric material such as quartz crystal, lithium niobate ($LiNbO_3$), lithium tantalate ($LiTaO_3$), lead zirconium titanate (PZT), lithium tetraborate ($Li_2B_4O_7$), or langasite crystal ($La_3Ga_5SiO_{14}$).

Incidentally, as the non-piezoelectric material constituting the vibrator substrate 2, there can be cited, for example, silicon and quartz. In particular, silicon is preferable as the non-piezoelectric material constituting the vibrator substrate 2. By constituting the vibrator substrate with silicon, the vibrator substrate 2 with superior vibration characteristics can be realized at relatively low cost. Further, it is possible to form the vibrator substrate 2 by etching with high dimensional accuracy using a known microfabrication technology. Therefore, there will hereinafter be described the case in which the vibrator substrate 2 is constituted by silicon for the sake of convenience of explanation.

Such a vibrator substrate 2 has a base section 21, and vibrating arms 22, 23 extending from an end portion on the +Y-axis side of the base section 21 toward the +Y-axis side.

The base section 21 supports the vibrating arms 22, 23. Further, the base section 21 spreads in the X-Y plane, and has a plate-like shape having a thickness in the Z-axis direction. Further, in the base section 21, the gyro element 1 is fixed to an object (e.g., a base 81 of a package 8 described later). Further, on the lower surface of the base section 21, there are disposed a drive signal terminal 51, a drive ground terminal 52, a detection signal terminal 53, and a detection ground terminal 54 arranged in the X-axis direction.

The vibrating arms 22, 23 are disposed side by side in the X-axis direction, and extend from the base section 21 in the +Y-axis direction. Further, as shown in FIG. 2, the cross-sectional shapes of these vibrating arms 22, 23 are each formed to have a roughly parallelogram shape. Further, the parallelograms as the cross-sectional shapes of the vibrating arms 22, 23 are tilted toward the directions opposite to each other, and are symmetrical to the Y-Z plane.

Further, on the upper surface of the vibrating arm 22, there are disposed the pair of driving piezoelectric elements 31, 32, and the detecting piezoelectric element 61. Similarly, on the upper surface of the vibrating arm. 23, there are disposed the pair of driving piezoelectric elements 33, 34, and the detecting piezoelectric element 62.

As shown in FIGS. 1 and 2, the driving piezoelectric elements 31, 32 are disposed so as to be separated from each other in the width direction of the vibrating arm 22, and the detecting piezoelectric element 61 is disposed between these driving piezoelectric elements 31, 32. Specifically, the driving piezoelectric element 31 is located at the end portion on the +X-axis side of the vibrating arm 22, the driving piezoelectric element 32 is located at the end portion on the −X-axis side of the vibrating arm 22, and the detecting piezoelectric element 61 is located at the central portion in the width direction of the vibrating arm 22.

Further, the driving piezoelectric elements 31, 32 and the detecting piezoelectric element 61 each extend along the Y-axis direction, and are each extended to the base section 21. The driving piezoelectric elements 31, 32 are arranged to be expanded and contracted in the Y-axis direction due to energization, and by performing the expansion and the contraction of the driving piezoelectric elements 31, 32 in respective phases reverse to each other, it is possible to make the vibrating arm 22 flexurally vibrate in the X-axis direction. Meanwhile, the detecting piezoelectric element 61 expands and contracts in accordance with the vibration (an out-of-plane vibration) in the Z-axis direction of the vibrating arm 22 to generate a charge corresponding to the expansion or the contraction.

Similarly, the driving piezoelectric elements 33, 34 are disposed so as to be separated from each other in the width direction of the vibrating arm 23, and the detecting piezoelectric element 62 is disposed between these driving piezoelectric elements 33, 34. Specifically, the driving piezoelectric element 33 is located at the end portion on the +X-axis side of the vibrating arm 23, the driving piezoelectric element 34 is located at the end portion on the −X-axis side of the vibrating arm 23, and the detecting piezoelectric element 62 is located at the central portion in the width direction of the vibrating arm 23.

Further, the driving piezoelectric elements 33, 34 and the detecting piezoelectric element 62 each extend along the Y-axis direction, and are each extended to the base section 21. The driving piezoelectric elements 33, 34 are arranged to be expanded and contracted in the Y-axis direction due to energization, and by performing the expansion and the contraction of the driving piezoelectric elements 33, 34 in respective phases reverse to each other, it is possible to make the vibrating arm 23 flexurally vibrate in the X-axis direction. Meanwhile, the detecting piezoelectric element 62 expands and contracts in accordance with the vibration (an out-of-plane vibration) in the Z-axis direction of the vibrating arm 23 to generate a charge corresponding to the expansion or the contraction.

The detecting piezoelectric elements 61, 62 have respective configurations substantially the same as each other. Specifically, as shown in FIG. 2, the detecting piezoelectric elements 61, 62 have detection signal electrodes 611, 621, detection ground electrodes 612, 622 disposed so as to be opposed to the detection signal electrodes 611, 621, and piezoelectric layers 613, 623 disposed between the detection signal electrodes 611, 621 and the detection ground electrodes 612, 622, respectively.

The detecting piezoelectric elements 61, 62 having such configurations are arranged so that the detection signal electrodes 611, 621 face to the vibrating arms 22, 23, respectively. Further, the detection signal electrodes 611, 621 are each connected to the detection signal terminal 53 via wiring not shown, and the detection ground electrodes 612, 622 are each connected to the detection ground terminal 54 via wiring not shown.

As described above, by using the detecting piezoelectric elements 61, 62, the configuration of the detection section is simplified, and at the same time, even in the case in which the vibrator substrate 2 does not have a piezoelectric property, the signal corresponding to the vibration in the Z-axis direction of the vibrating arms 22, 23 can be taken out.

Incidentally, the driving piezoelectric elements 31, 32, 33, and 34 also have respective configurations substantially the same as each other. Specifically, as shown in FIG. 2, the driving piezoelectric elements 31, 32, 33, and 34 have drive signal electrodes 311, 321, 331, and 341, drive ground electrodes 312, 322, 332, and 342 disposed so as to be opposed to the drive signal electrodes 311, 321, 331, and 341, and the piezoelectric layers 313, 323, 333, and 343 disposed between the drive signal electrodes 311, 321, 331, and 341 and the drive ground electrodes 312, 322, 332, and 342, respectively.

Further, the driving piezoelectric elements 31, 33 are disposed so that the drive signal electrodes 311, 331 face to the vibrating arms 22, 23, respectively, and the driving piezoelectric elements 32, 34 are disposed so that the drive ground electrodes 322, 342 face to the vibrating arms 22, 23, respectively. Further, the drive signal electrodes 311, 321, 331, and 341 are each connected to the drive signal terminal 51 via wiring not shown, and the drive ground electrodes 312, 322, 332, and 342 are each connected to the drive ground terminal 52 via wiring not shown.

Therefore, when applying an alternating voltage to the driving piezoelectric elements 31 through 34 via the drive signal terminal 51 and the drive ground terminal 52, there are alternately repeated the state in which the driving piezoelectric elements 31, 33 are expanded and the driving piezoelectric elements 32, 34 are contracted, and the state in which the driving piezoelectric elements 31, 33 are contracted and the driving piezoelectric elements 32, 34 are expanded. Thus, the vibrating arms 22, 23 vibrate in an X-axis in-phase mode.

By using the driving piezoelectric elements 31 through 34, as described above, the configuration of the drive section is simplified, and at the same time, even in the case in which the vibrator substrate 2 does not have the piezoelectric property as in the case of the present embodiment, or the case in which the vibrator substrate 2 has the piezoelectric property but the directions of the polarization axis and the crystal axis are not suitable for the flexural vibration in the X-axis direction, it is possible to make each of the vibrating arms 22, 23 flexurally vibrate in the X-axis direction.

Here, since the cross-sectional shapes of the vibrating arms 22, 23 are each a parallelogram as described above, the balance of the vibration in the X-axis direction between the vibrating arms 22, 23 is lost, and thus, the vibrating arms 22, 23 vibrate in the X-axis in-phase mode including the vibration component in the Z-axis direction in the drive vibration mode. Further, since the tilt directions of the parallelograms as the cross-sectional shapes of the vibrating arms 22, 23 are opposite to each other, the vibration components in the Z-axis direction included in the vibrating arms 22, 23 are in the respective directions opposite to each other. Specifically, in the drive vibration mode, as shown in FIG. 3, the vibrating arms 22, 23 vibrate in the X-axis in-phase mode and at the same time in the Z-axis inverse-phase mode.

Since the vibration in the Z-axis direction is combined with the vibration of the vibrating arms 22, 23 as described above, in the drive vibration mode, the charges (the signals) $Q_{61}$, $Q_{62}$ is taken out from the detecting piezoelectric elements 61, 62, and what is obtained by adding the charges $Q_{61}$, $Q_{62}$ to each other is taken out between the detection signal terminal 53 and the detection ground terminal 54 as the detection signal SS as shown in FIG. 4. Since the charges $Q_{61}$, $Q_{62}$ respectively generated from the detecting piezoelectric elements 61, 62 are opposite in phase to each other, and roughly the same in amplitude as each other, the detection signal SS obtained by adding the charges $Q_{61}$, $Q_{62}$ to each other becomes approximately 0 (zero). Therefore, the noise (a signal not caused by the angular velocity ωy) is reduced, and thus, the degradation of the detection accuracy of the gyro element 1 is reduced. Therefore, the gyro element 1 high in detection accuracy is obtained.

Further, according to the gyro element 1, even in the case in which the masks M1, M2 are displaced from each other in the X-axis direction in the manufacturing process as shown in FIG. 5A, only the tilts of the parallelograms of the cross-sectional shapes of the vibrating arms 22, 23 slightly differ from each other as shown in FIG. 5B, but the relationship that the vibrating arms 22, 23 vibrate in the Z-axis inverse-phase mode in the drive vibration mode is maintained. Therefore, according to the gyro element 1, even if the mask displacement occurs, the advantage described above can be exerted.

Here, it is preferable to set, for example, the displacement width w in the X-axis direction between the lower surface and the upper surface of the vibrating arms 22, 23 to be equal to or more than 10 times as large as the maximum possible mask displacement amount in the normal operation so that the cross-sectional shapes of the vibrating arms 22, 23 are kept in the parallelograms having the tilts opposite to each other even if the mask displacement occurs. Specifically, in the case of a mechanism in which the maximum mask displacement of 0.1 μm might occur, it is sufficient to design the displacement width w to be equal to or larger than 1 μm. Thus, it is possible to make the vibrating arms 22, 23 vibrate in the Z-axis inverse-phase mode in the drive vibration mode irrespective of the presence or absence of the mask displacement.

It should be noted that if the tilts of the parallelograms of the cross-sectional shapes of the vibrating arms 22, 23 differ from each other as shown in FIG. 5B due to the mask displacement, the amplitude in the Z-axis direction differs between the vibrating arms 22, 23 as shown in FIG. 5C in some cases. In such a case, since a difference occurs in deflection amount between the detecting piezoelectric elements 61, 62 in the drive vibration mode, the charges $Q_{61}$, $Q_{62}$ of the detecting piezoelectric elements 61, 62 are not sufficiently canceled out, and the charge not canceled is taken out as the detection signal SS as shown in FIG. 6. Therefore, there is a possibility that the advantage described above is reduced. Therefore, it is preferable to roughly uniform the amplitude in the Z-axis direction between the vibrating arms 22, 23.

As a method of uniforming the amplitude, there can be cited, for example, a method of adjusting the mass of at least one of the vibrating arms 22, 23. The case in which the amplitude in the Z-axis direction of the vibrating arm 23 is larger than the amplitude in the Z-axis direction of the vibrating arm 22 as shown in FIG. 5C will hereinafter be described as a representative. As a first method, there is a method of removing a part of the mass adjustment film 41 disposed in a tip portion of the vibrating arm 23 using laser irradiation or the like to reduce the mass of the vibrating arm 23 to thereby decrease the amplitude in the Z-axis direction of the vibrating arm 23. As a second method, there is a method of disposing a weight on the mass adjustment film 41 disposed in the tip portion of the vibrating arm 22 to increase the mass of the vibrating arm 22 to thereby increase the amplitude in the Z-axis direction of the vibrating arm 22. According to such methods, it is possible to uniform the amplitude in the Z-axis direction between the vibrating arms 22, 23 with relative ease.

Hereinabove, the configuration of the gyro element 1 is described in detail.

Then, drive of the gyro element 1 will be described. Firstly, as shown in FIG. 7A, the vibrating arms 22, 23 are made to vibrate in the drive vibration mode. In this state, since the charges $Q_{61}$, $Q_{62}$ generated in the detecting piezoelectric elements 61, 62 are canceled out as described above, the detection signal SS is approximately 0 (see FIG. 4). When the angular velocity ωy around the Y axis is applied to the gyro element 1 in the state of the drive vibration mode, the Coriolis force acts to newly excite the vibration in the Z-axis in-phase mode in the vibrating arms 22, 23 as the detection vibration mode as shown in FIG. 7B. In such a detection vibration mode, the charges $Q_{61}$, $Q_{62}$ in the same phase are generated from the detecting piezoelectric elements 61, 62, and the detection signal SS obtained by adding these charges $Q_{61}$, $Q_{62}$ to each other is taken out as shown in FIG. 8. Then, the angular velocity ωy is obtained based on the magnitude of the detection signal SS.

According to such a gyro element 1, since the detection signal SS in the drive vibration mode can be set to approximately 0, the noise can be reduced, and the gyro element 1 high in detection accuracy can be obtained. Further, in the detection vibration mode, since the charges $Q_{61}$, $Q_{62}$ in the same phase are generated from the detecting piezoelectric elements 61, 62, it is possible to obtain the detection signal SS high in intensity. Therefore, it is possible for the gyro element 1 to exert high detection accuracy.

Further, even in the case in which the mask displacement occurs in the manufacturing process, since it is possible to vibrate the vibrating arms 22, 23 in the Z-axis inverse-phase mode in the drive vibration mode, the advantage described above can more surely be exerted.

The gyro element 1 according to the first embodiment is hereinabove described. It should be noted that although in the present embodiment, the parallelograms are adopted as the cross-sectional shapes of the vibrating arms 22, 23 in order to vibrate the vibrating arms 22, 23 in the X-axis in-phase mode and in the Z-axis inverse-phase mode, the cross-sectional shapes of the vibrating arms 22, 23 are not limited thereto providing the drive vibration mode described above can be obtained, but can also be, for example, the cross-sectional shapes shown in each of FIGS. 9A through 9C. Further, although in the gyro element 1 according to the present embodiment, a hammerhead (a wide weight section) is not provided to the tip portion of each of the vibrating arms 22, 23, it is also possible to provide the hammerhead to each of the tip portions of the vibrating arms 22, 23. Thus, the mass effect of the tips of the vibrating arms 22, 23 increases, and assuming that the frequency in the drive vibration mode is the same, the length of the vibrating arms 22, 23 can be made shorter compared to the case in which the hammerheads are not provided. Further, assuming that the length of the vibrating arms 22, 23 is the same, the frequency can be made lower.

Second Embodiment

Figure 10:
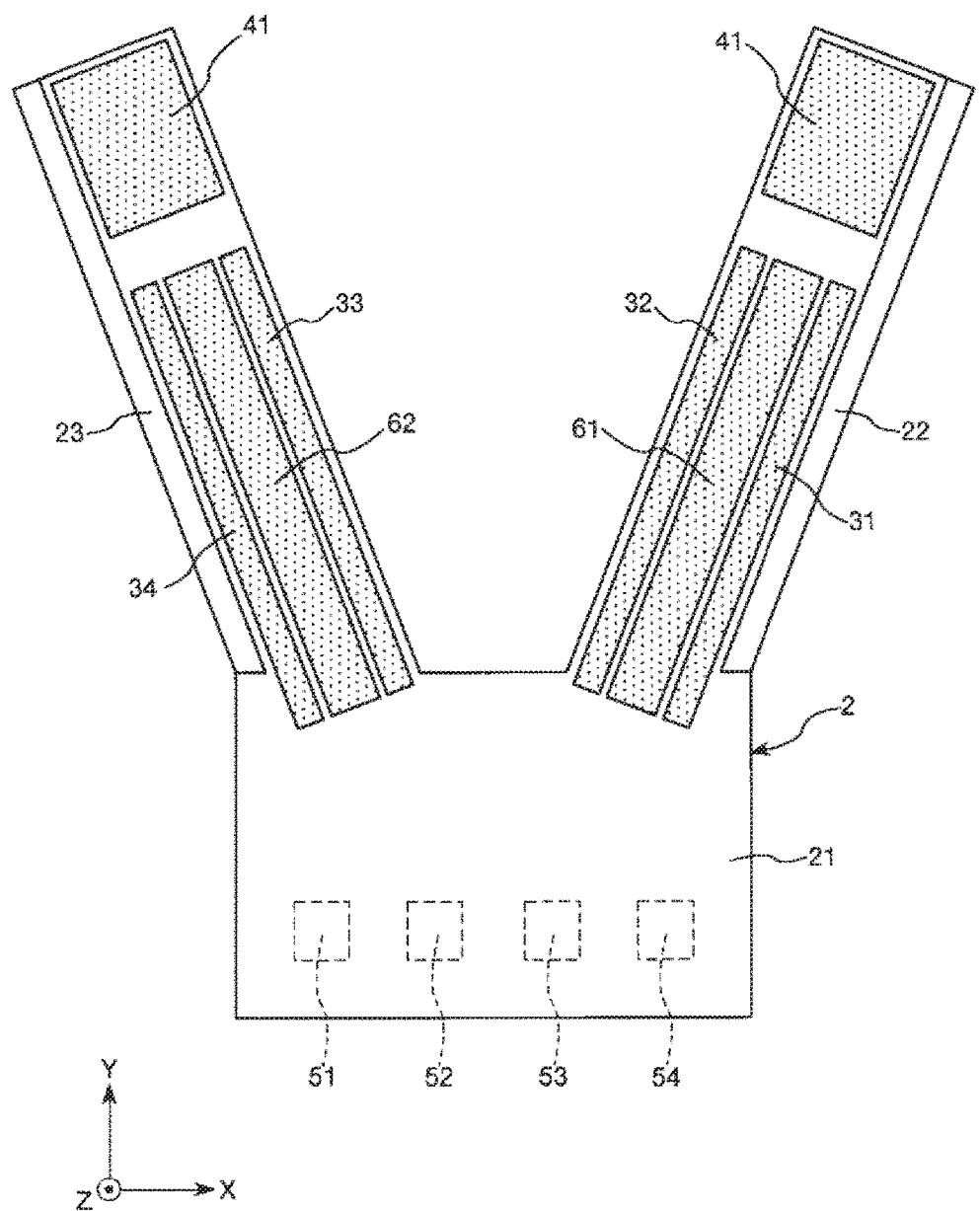
FIG. 10 is a plan view showing a gyro element (an angular velocity detection element) according to a second embodiment of the invention.

FIG. 10 is a plan view showing a gyro element (an angular velocity detection element) according to a second embodiment of the invention.

Hereinafter, the second embodiment will be described focusing mainly on the differences from the embodiment described above, and the explanation of substantially the same matters will be omitted.

The second embodiment is substantially the same as the first embodiment described above except the point that the extending direction of the pair of vibrating arms is different. It should be noted that in FIG. 10, the constituents substantially identical to those of the embodiment described above are denoted by the same reference symbols.

As shown in FIG. 10, in the gyro element 1 according to the present embodiment, the vibrating arms 22, 23 are disposed extending in directions tilted with respect to the Y axis so that the distance (the distance in the X-axis direction) from each other gradually increases toward the tip side. Thus, it is possible to decrease the contact between the vibrating arms 22, 23 when driving the vibrating arms 22, 23 while preventing the growth in size of the base section 21.

According also to such a second embodiment as described above, substantially the same advantages as in the first embodiment described above can be obtained.

Third Embodiment

Figure 11:
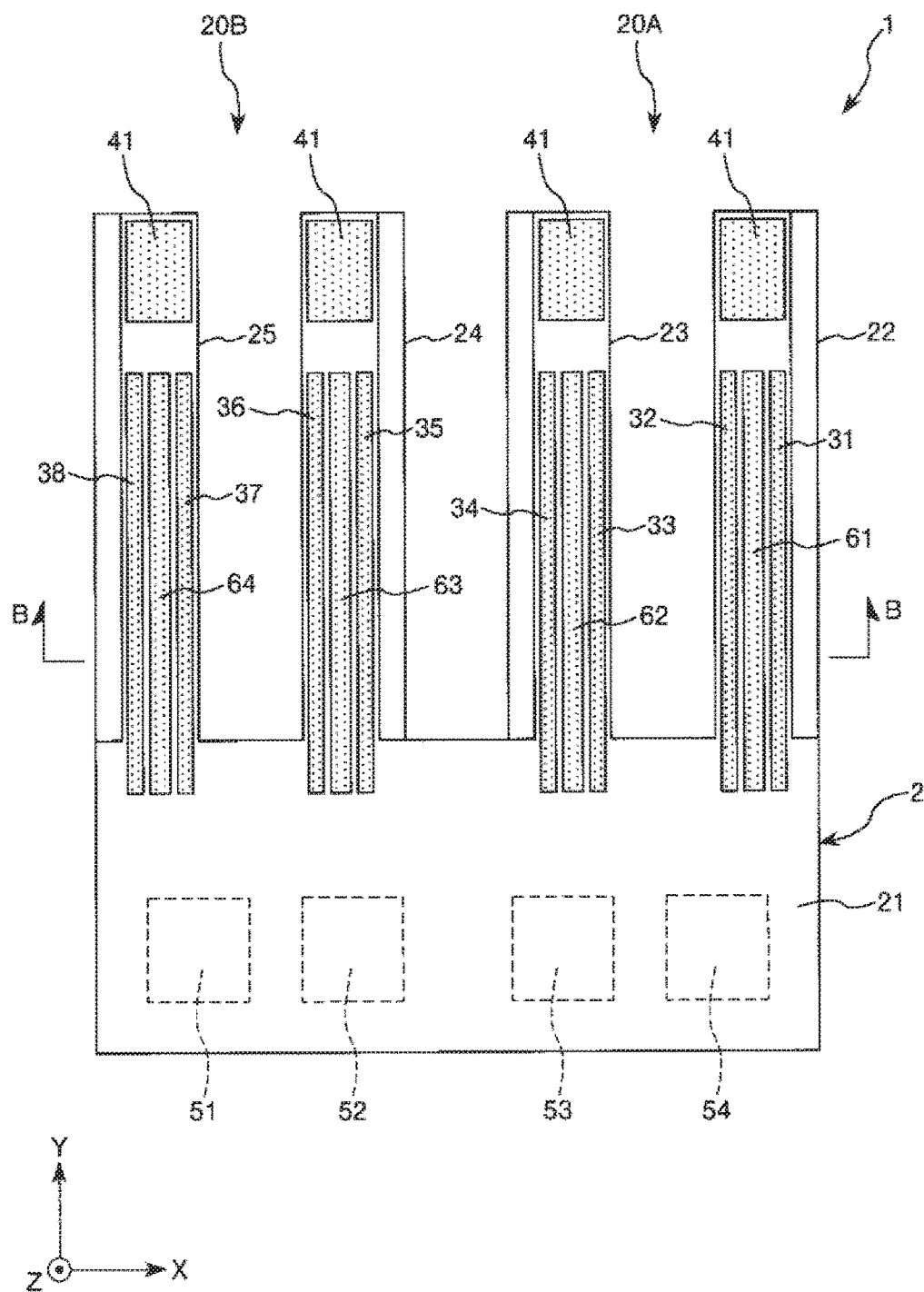
FIG. 11 is a plan view showing a gyro element (an angular velocity detection element) according to a third embodiment of the invention.
Figure 12:
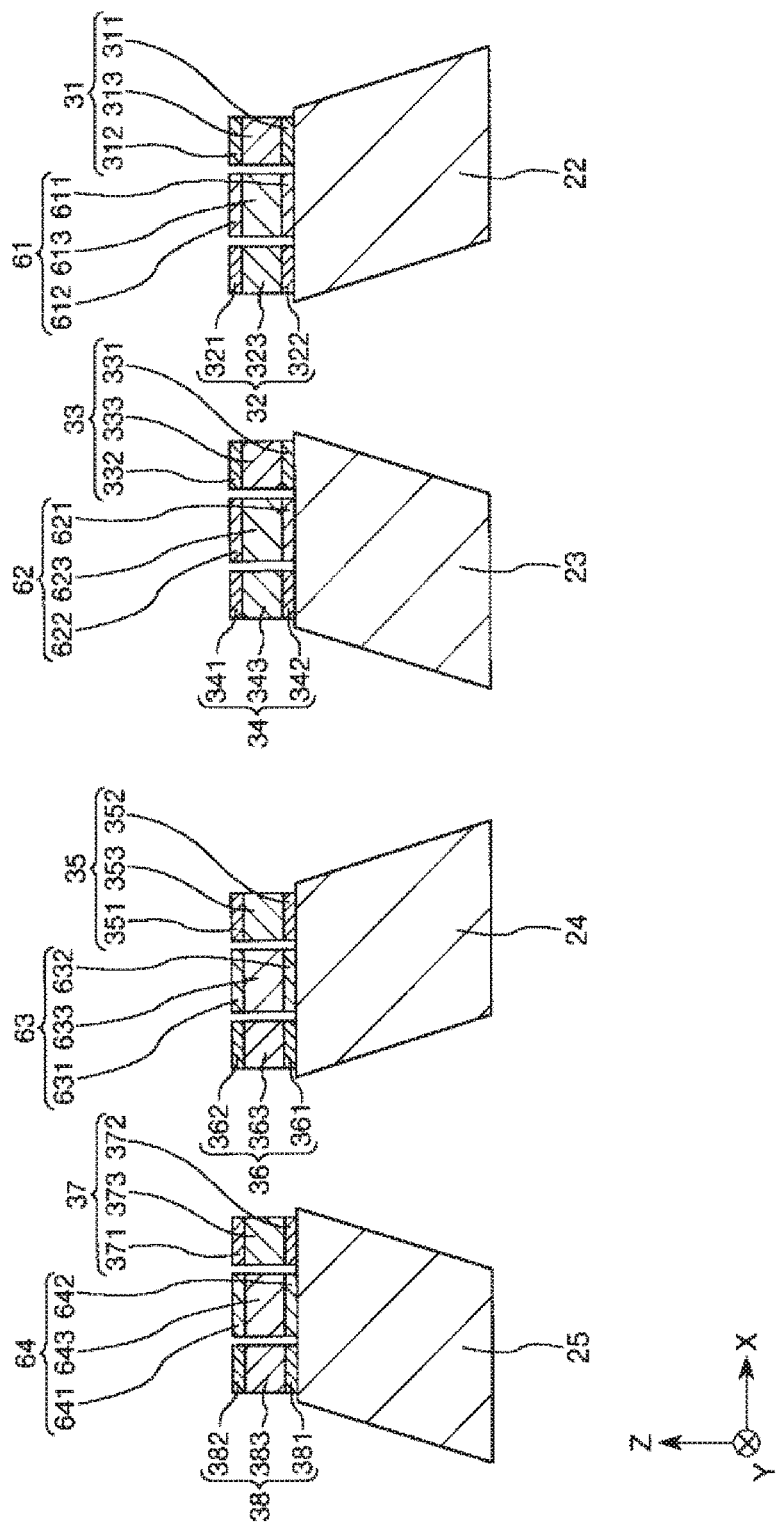
FIG. 12 is a cross-sectional view along the line B-B in FIG. 11.
Figure 13:
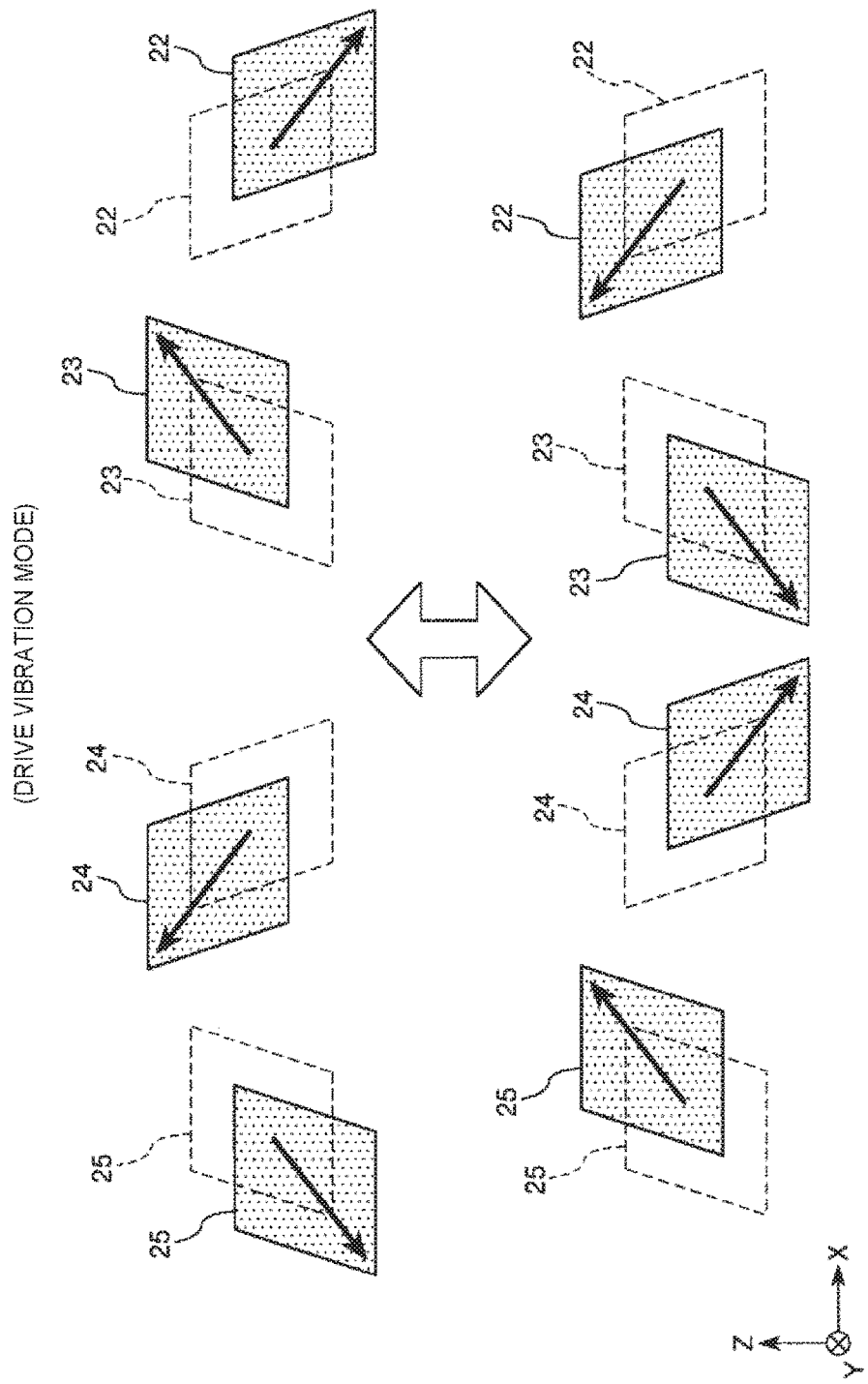
FIG. 13 is a diagram showing a drive vibration mode of the gyro element shown in FIG. 11.
Figure 14A:
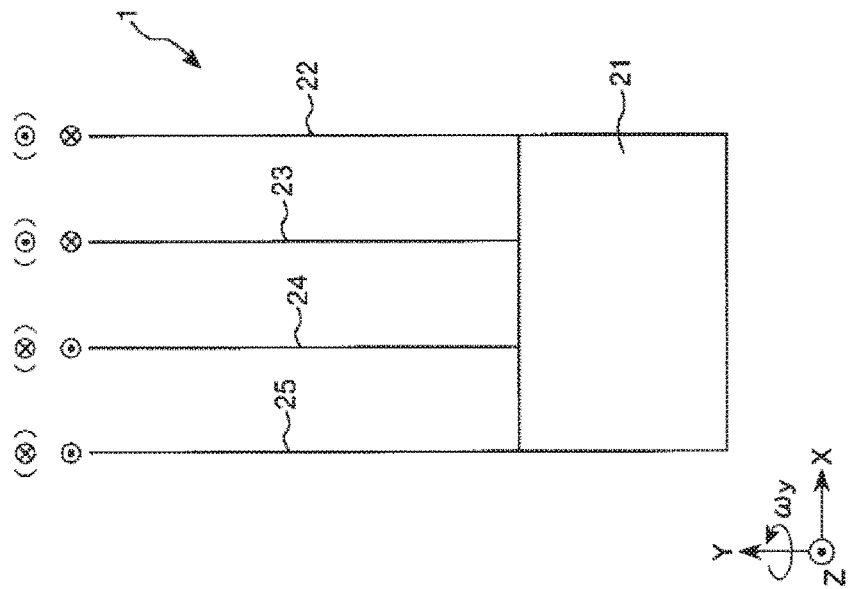
FIG. 14A is a schematic diagram showing the drive vibration mode.
Figure 14B:
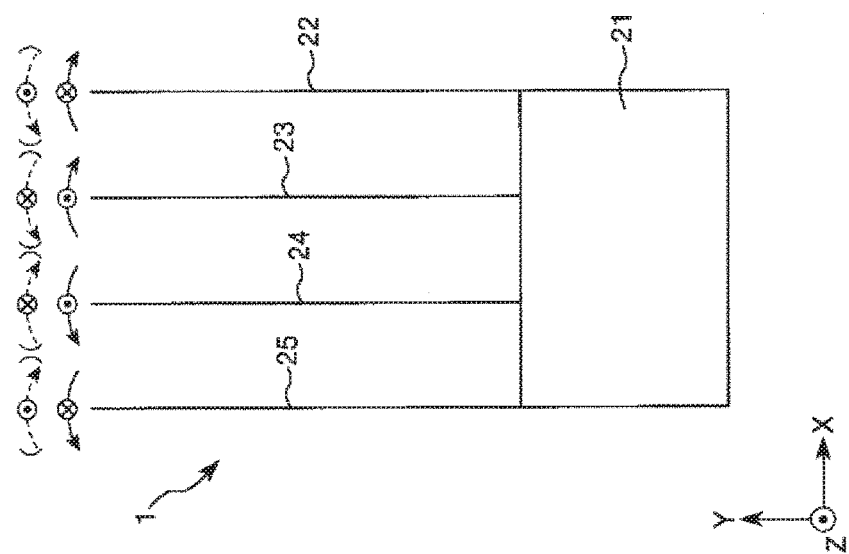
FIG. 14B is a schematic diagram showing the detection vibration mode.
Figure 15A:
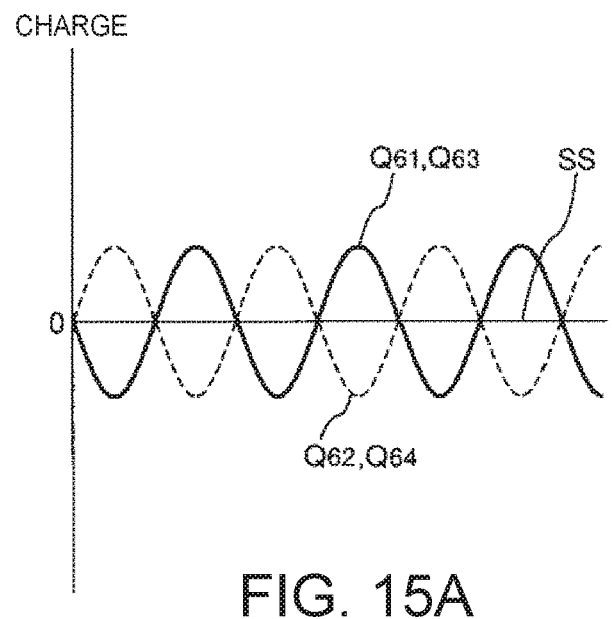
FIG. 15A is a diagram showing the detection signal in the drive vibration mode.
Figure 15B:
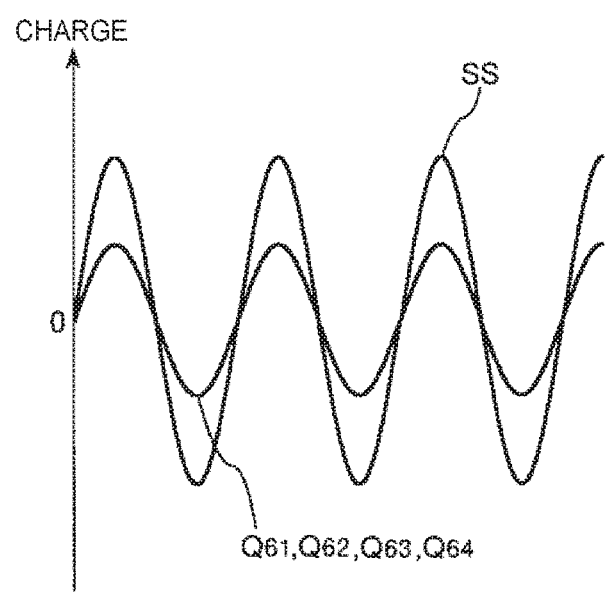
FIG. 15B is a diagram showing the detection signal in the detection vibration mode.

FIG. 11 is a plan view showing a gyro element (an angular velocity detection element) according to a third embodiment of the invention. FIG. 12 is a cross-sectional view along the line B-B in FIG. 11. FIG. 13 is a diagram showing the drive vibration mode of the gyro element shown in FIG. 11. FIG. 14A is a schematic diagram showing the drive vibration mode, and FIG. 14B is a schematic diagram showing the detection vibration mode. FIG. 15A is a diagram showing the detection signal in the drive vibration mode, and FIG. 15B is a diagram showing the detection signal in the detection vibration mode.

Hereinafter, the third embodiment will be described mainly focusing on the differences from the embodiments described above, and the explanation of substantially the same matters will be omitted.

The third embodiment is substantially the same as the first embodiment described above except the point that the number of the vibrating arms is different. It should be noted that in FIGS. 11 through 13, 14A, 14B, 15A, and 15B, the constituents substantially identical to those of the embodiments described above are denoted by the same reference symbols.

As shown in FIG. 11, the vibrator substrate 2 of the gyro element 1 according to the present embodiment has the base section 21, and four vibrating arms 22, 23, 24, and 25 extending from the end portion on the +Y-axis side of the base section 21 toward the +Y-axis direction. Further, as shown in FIG. 12, the cross-sectional shapes of the vibrating arms 22, 23, 24, and 25 are each formed to have a roughly parallelogram shape. Further, the tilt of the parallelograms as the cross-sectional shapes of the vibrating arms 22, 24 and the tilt of the parallelograms as the cross-sectional shapes of the vibrating arms 23, 25 are opposite to each other. In such a configuration, the vibrating arms 22, 23 constitute a first vibrating system 20A, and the vibrating arms 23, 25 constitute a second vibrating system 20B.

Further, on the upper surface of the vibrating arm 24, there are disposed a pair of driving piezoelectric elements 35, 36, and a detecting piezoelectric element 63. As shown in FIG. 12, the driving piezoelectric elements 35, 36 are disposed so as to be separated from each other in the width direction of the vibrating arm 24, and the detecting piezoelectric element 63 is disposed between the driving piezoelectric elements 35, 36.

Further, the driving piezoelectric elements 35, 36 and the detecting piezoelectric element 63 each extend along the Y-axis direction, and are each extended to the base section 21. The driving piezoelectric elements 35, 36 are arranged to be expanded and contracted in the Y-axis direction due to energization, and by performing the expansion and the contraction of the driving piezoelectric elements 35, 36 in respective phases reverse to each other, it is possible to make the vibrating arm 24 flexurally vibrate in the X-axis direction. Meanwhile, the detecting piezoelectric element 63 expands and contracts in accordance with the vibration in the Z-axis direction of the vibrating arm 24 to generate a charge corresponding to the expansion or the contraction.

Similarly, on the upper surface of the vibrating arm 25, there are disposed a pair of driving piezoelectric elements 37, 38, and a detecting piezoelectric element 64. As shown in FIG. 12, the driving piezoelectric elements 37, 38 are disposed so as to be separated from each other in the width direction of the vibrating arm 25, and the detecting piezoelectric element 64 is disposed between the driving piezoelectric elements 37, 38.

Further, the driving piezoelectric elements 37, 38 and the detecting piezoelectric element 64 each extend along the Y-axis direction, and are each extended to the base section 21. The driving piezoelectric elements 37, 38 are arranged to be expanded and contracted in the Y-axis direction due to energization, and by performing the expansion and the contraction of the driving piezoelectric elements 37, 38 in respective phases reverse to each other, it is possible to make the vibrating arm 25 flexurally vibrate in the X-axis direction. Meanwhile, the detecting piezoelectric element 64 expands and contracts in accordance with the vibration in the Z-axis direction of the vibrating arm 25 to generate a charge corresponding to the expansion or the contraction.

The detecting piezoelectric elements 63, 64 have configurations substantially the same as those of the detecting piezoelectric elements 61, 62, respectively. Specifically, as shown in FIG. 12, the detecting piezoelectric elements 63, 64 have detection signal electrodes 631, 641, detection ground electrodes 632, 642 disposed so as to be opposed to the detection signal electrodes 631, 641, and piezoelectric layers 633, 643 disposed between the detection signal electrodes 631, 641 and the detection ground electrodes 632, 642, respectively.

Further, the detecting piezoelectric elements 63, 64 are disposed so that the detection ground electrodes 632, 642 face to the vibrating arms 24, 25, respectively. Further, the detection signal electrodes 631, 641 are each connected to the detection signal terminal 53 via wiring not shown, and the detection ground electrodes 632, 642 are each connected to the detection ground terminal 54 via wiring not shown.

The driving piezoelectric elements 35, 36, 37, and 38 have substantially the same configurations as those of the driving piezoelectric elements 31, 32, 33, and 34, respectively. Specifically, as shown in FIG. 12, the driving piezoelectric elements 35, 36, 37, and 38 have drive signal electrodes 351, 361, 371, and 381, drive ground electrodes 352, 362, 372, and 382 disposed so as to be opposed to the drive signal electrodes 351, 361, 371, and 381, and the piezoelectric layers 353, 363, 373, and 383 disposed between the drive signal electrodes 351, 361, 371, and 381 and the drive ground electrodes 352, 362, 372, and 382, respectively.

Further, the driving piezoelectric elements 36, 38 are disposed so that the drive signal electrodes 361, 381 face to the vibrating arms 24, 25, respectively, and the driving piezoelectric elements 35, 37 are disposed so that the drive ground electrodes 352, 372 face to the vibrating arms 24, 25, respectively. Further, the drive signal electrodes 351, 361, 371, and 381 are each connected to the drive signal terminal 51 via wiring not shown, and the drive ground electrodes 352, 362, 372, and 382 are each connected to the drive ground terminal 52 via wiring not shown.

The gyro element 1 having such a configuration is driven in the drive vibration mode shown in FIGS. 13 and 14A. Specifically, the vibrating arms 22, 23 vibrate in the X-axis in-phase mode, and the vibrating arms 24, 25 vibrate in the X-axis in-phase mode, and the vibrating arms 22, 23 and the vibrating arms 24, 25 vibrate in the X-axis inverse-phase mode. Further, coupling to such vibrations in the X-axis direction, the vibrating arms 22, 25 vibrate in the Z-axis in-phase mode, and the vibrating arms 23, 24 vibrate in the Z-axis in-phase mode, and the vibrating arms 22, 25 and the vibrating arms 23, 24 vibrate in the Z-axis inverse-phase mode.

In such a drive vibration mode, since the vibration in the X-axis direction of the vibrating arms 22, 23 and the vibration in the X-axis direction of the vibrating arms 24, 25 are canceled out, the vibration leakage via the base section 21 is reduced. Further, in such a drive vibration mode, the charges $Q_{61}$, $Q_{63}$ generated from the detecting piezoelectric elements 61, 63 and the charges $Q_{62}$, $Q_{64}$ generated from the detecting piezoelectric elements 62, 64 have the respective phases reverse to each other, and are therefore canceled out to make the detection signal SS approximately 0 as shown in FIG. 15A.

When the angular velocity ωy around the Y axis is applied to the gyro element 1 in the state of the drive vibration mode, the Coriolis force acts to newly excite the vibration in the detection vibration mode as shown in FIG. 14B. Specifically, the vibrating arms 22, 23 vibrate in the Z-axis in-phase mode, and the vibrating arms 24, 25 vibrate in the Z-axis in-phase mode, and the vibrating arms 22, 23 and the vibrating arms 24, 25 vibrate in the Z-axis inverse-phase mode. When such a detection vibration mode is excited, the charges $Q_{61}$, $Q_{62}$, $Q_{63}$, and $Q_{64}$ the same in phase are generated from the detecting piezoelectric elements 61, 62, 63, and 64, and the detection signal SS obtained by adding the charges $Q_{61}$, $Q_{62}$, $Q_{63}$, and $Q_{64}$ to each other is taken out between the detection signal terminal 53 and the detection ground terminal 54 as shown in FIG. 15B. Then, the angular velocity ωy is obtained based on the magnitude of the detection signal SS thus taken out.

In such a configuration, since it is possible to use the detection signal SS obtained by adding the charges $Q_{61}$, $Q_{62}$, $Q_{63}$, and $Q_{64}$ respectively generated from the four detecting piezoelectric elements 61, 62, 63, and 64 to each other, the intensity of the detection signal SS can be increased compared to, for example, the case of the first embodiment described above, and the detection accuracy can be improved accordingly. Further, since the vibrations in the X-axis direction and the Z-axis direction of the vibrating arms 22, 23, 24, and 25 can be canceled out in the drive vibration mode and the detection vibration mode, the vibration leakage of the gyro element 1 can effectively be reduced, and thus, the detection accuracy is further improved.

According also to such a third embodiment as described above, substantially the same advantages as in the first embodiment described above can be exerted.

Fourth Embodiment

Figure 16:
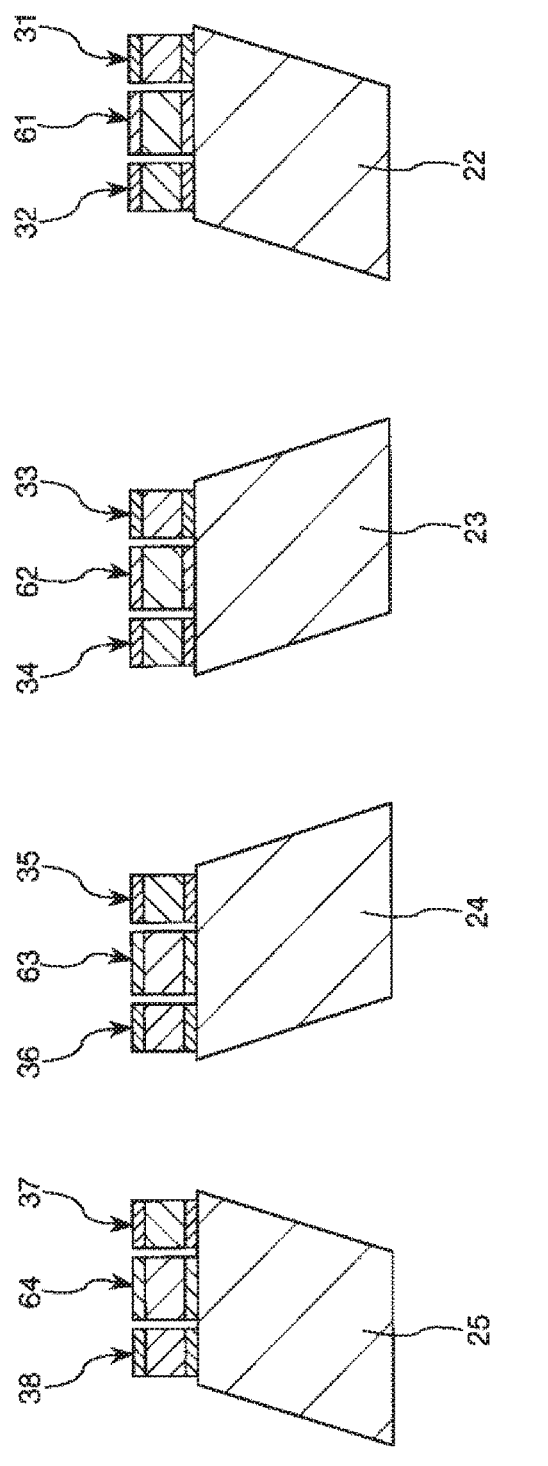
FIG. 16 is a cross-sectional view showing a gyro element (an angular velocity detection element) according to a fourth embodiment of the invention.
Figure 17:
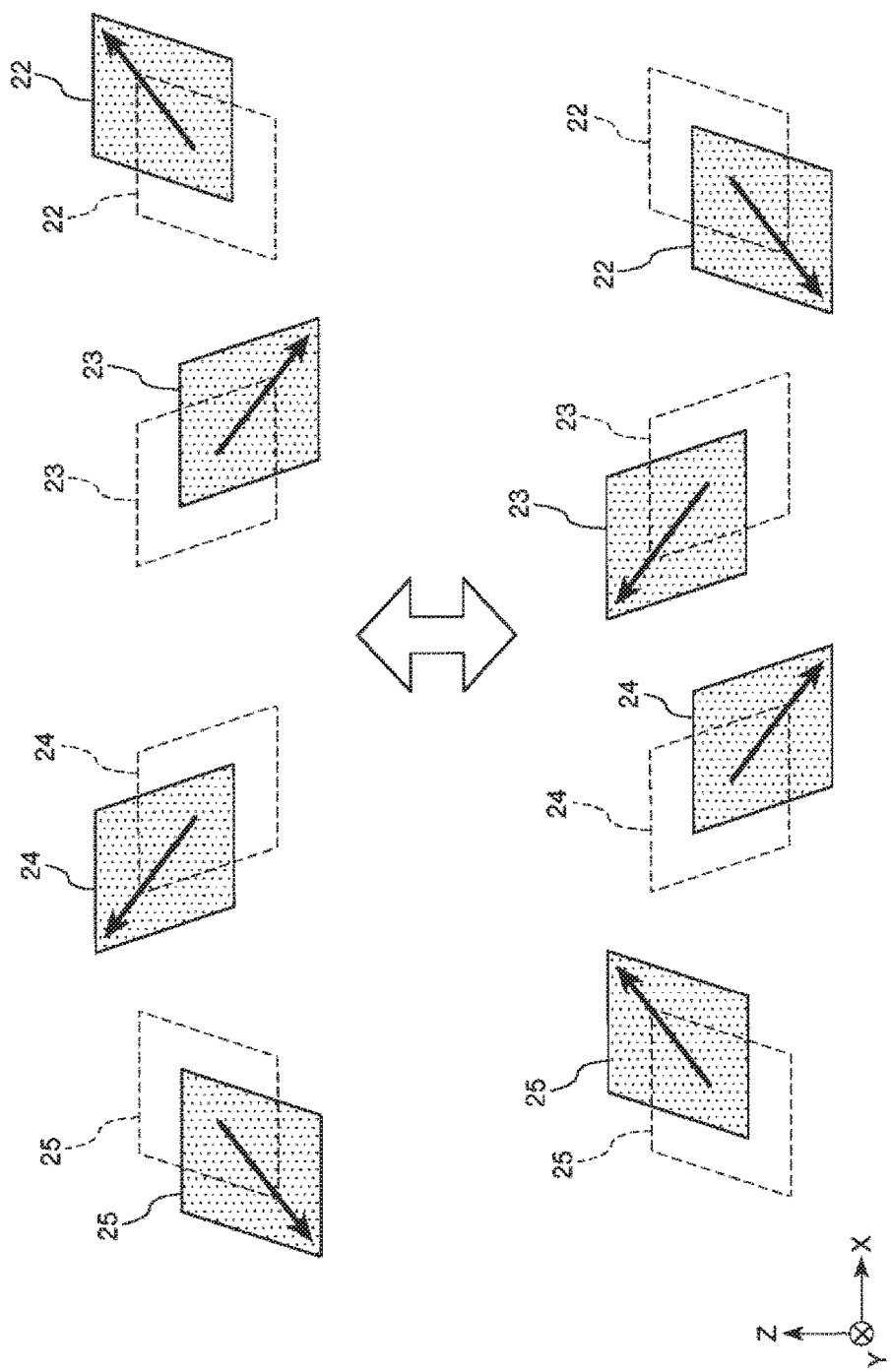
FIG. 17 is a diagram showing a drive vibration mode of the gyro element shown in FIG. 16.

FIG. 16 is a cross-sectional view showing a gyro element (an angular velocity detection element) according to a fourth embodiment of the invention. FIG. 17 is a diagram showing the drive vibration mode of the gyro element shown in FIG. 16.

Hereinafter, the fourth embodiment will be described mainly focusing on the differences from the embodiments described above, and the explanation regarding substantially the same matters will be omitted.

The fourth embodiment is substantially the same as the third embodiment described above except the point that the cross-sectional shapes of the vibrating arms are different. It should be noted that in FIGS. 16 and 17, the constituents substantially identical to those of the embodiments described above are denoted by the same reference symbols.

As shown in FIG. 16, in the gyro element 1 according to the present embodiment, the cross-sectional shapes of the vibrating arms 22, 23 are vertically flipped with respect to those in the third embodiment. Specifically, the vibrating arms 22, 25 have the same shape (the parallelogram tilted in the same direction), and the vibrating arms 23, 24 have the same shape (the parallelogram tilted in the same direction), and are tilted toward the opposite direction to that of the vibrating arms 22, 25.

The gyro element 1 having such a configuration vibrates in the drive vibration mode shown in FIG. 17. Specifically, the vibrating arms 22, 23 vibrate in the X-axis in-phase mode, and the vibrating arms 24, 25 vibrate in the X-axis in-phase mode, and the vibrating arms 22, 23 and the vibrating arms 24, 25 vibrate in the X-axis inverse-phase mode. Further, coupling to such vibrations in the X-axis direction, the vibrating arms 22, 24 vibrate in the Z-axis in-phase mode, and the vibrating arms 23, 25 vibrate in the Z-axis in-phase mode, and the vibrating arms 22, 24 and the vibrating arms 23, 25 vibrate in the Z-axis inverse-phase mode. According to such vibrations, when the vibrating arms 23, 24 adjacent to each other come close to each other, the vibrating arms can be shifted from each other toward the respective directions opposite to the Z-axis direction. Therefore, the contact between the vibrating arms 23, 24 is reduced, and thus, the damage of the gyro element 1 can be reduced. Further, since the vibrating arms 23, 24 can be made close to each other accordingly, miniaturization of the gyro element 1 can be achieved.

According also to such a fourth embodiment as described above, substantially the same advantages as in the first embodiment described above can be exerted.

Fifth Embodiment

Figure 18:
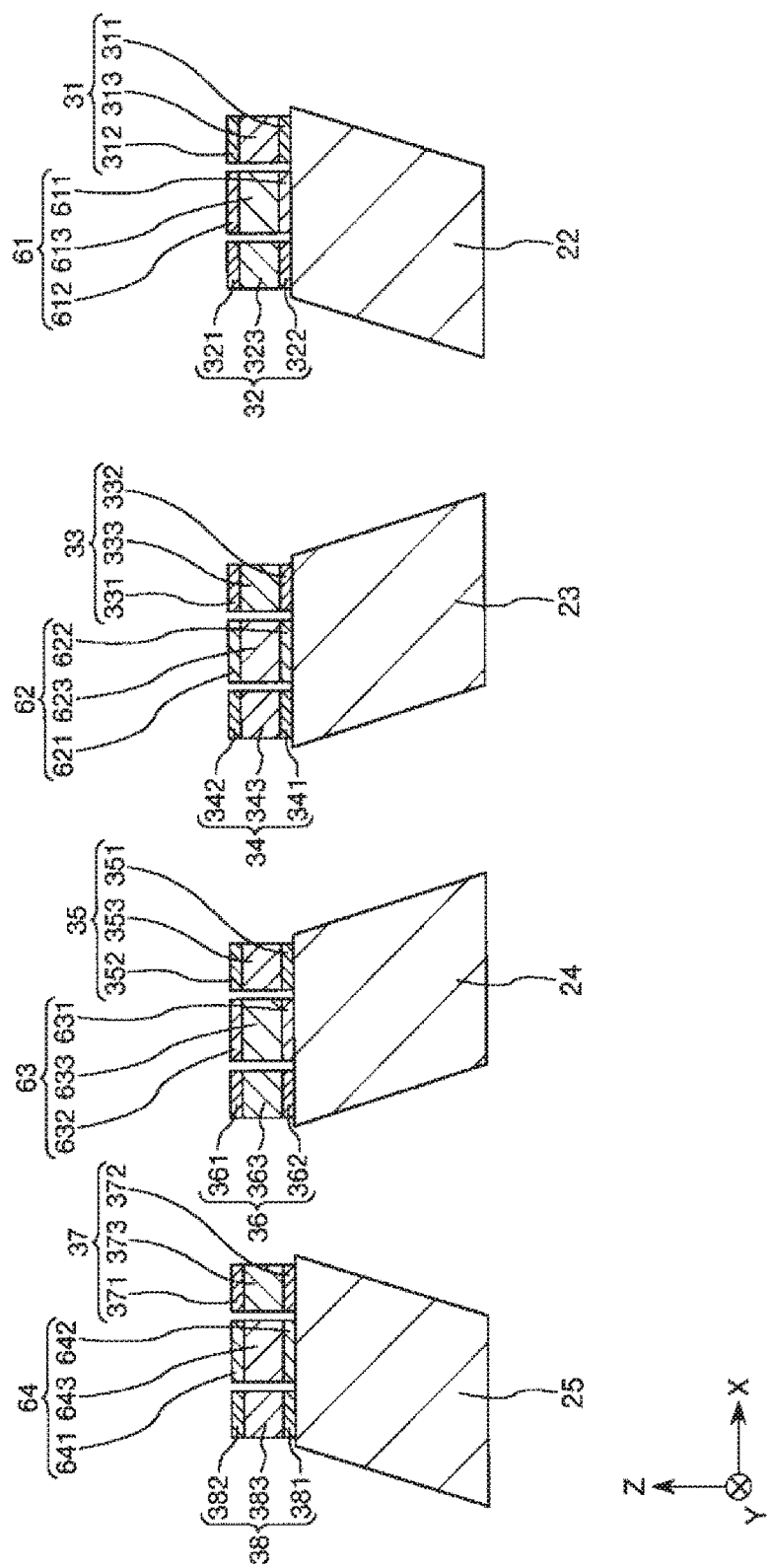
FIG. 18 is a cross-sectional view showing a gyro element (an angular velocity detection element) according to a fifth embodiment of the invention.
Figure 19:
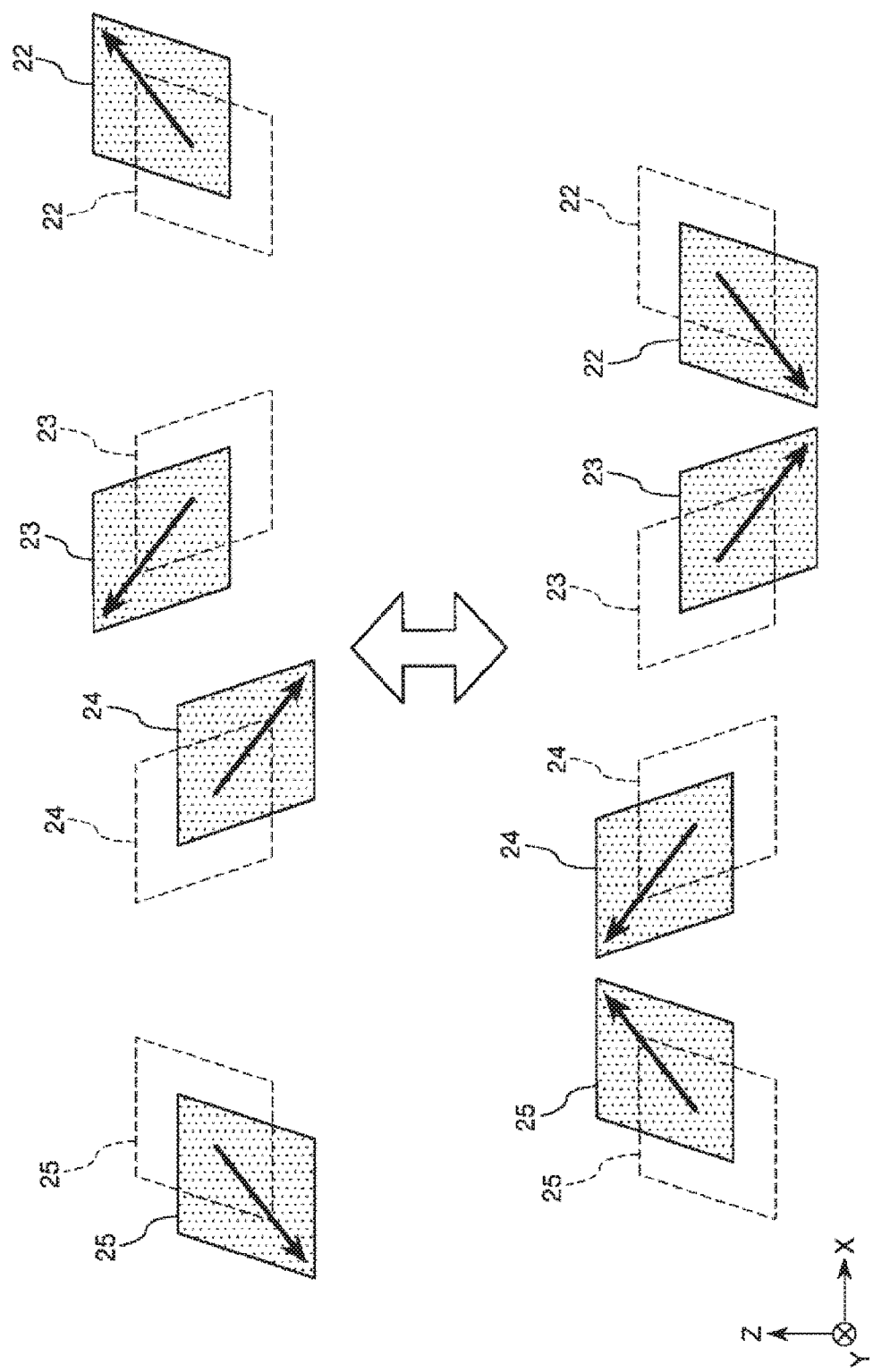
FIG. 19 is a diagram showing a drive vibration mode of the gyro element shown in FIG. 18.
Figure 20A:
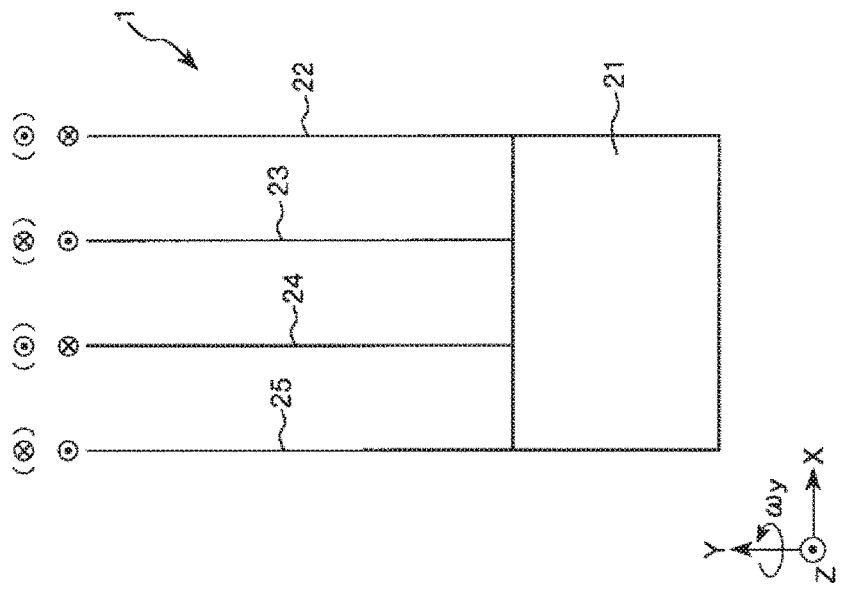
FIG. 20A is a schematic diagram showing the drive vibration mode.
Figure 20B:
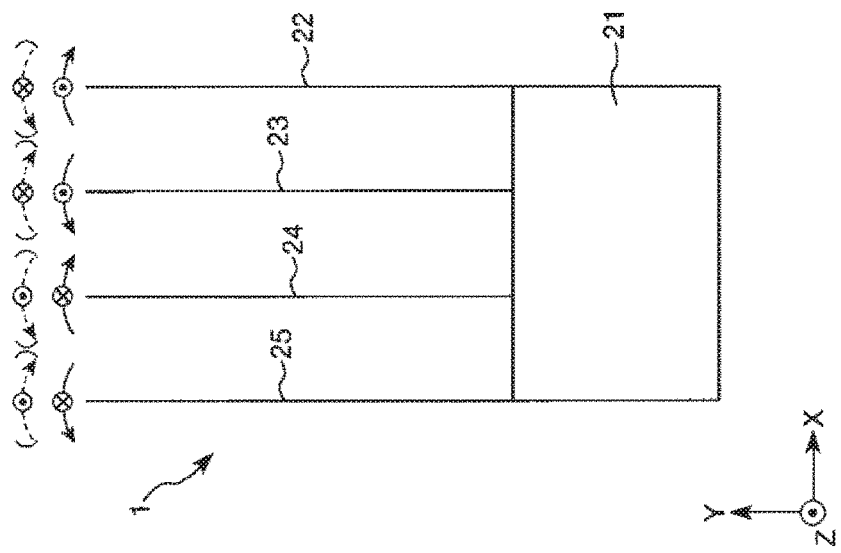
FIG. 20B is a schematic diagram showing the detection vibration mode.
Figure 21A:
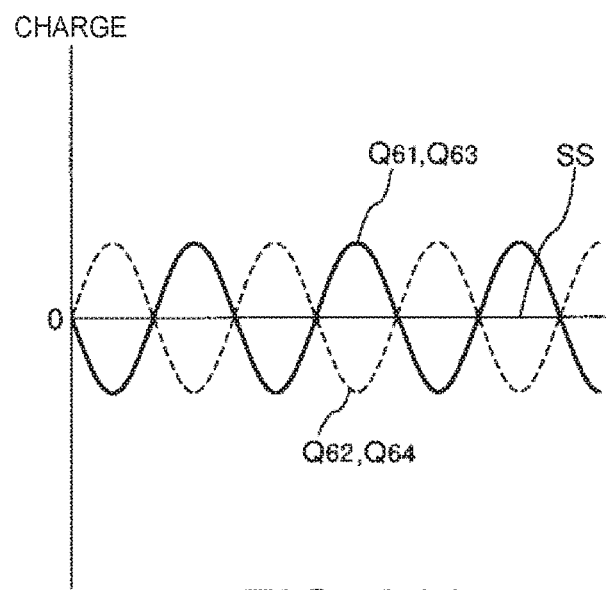
FIG. 21A is a diagram showing the detection signal in the drive vibration mode.
Figure 21B:
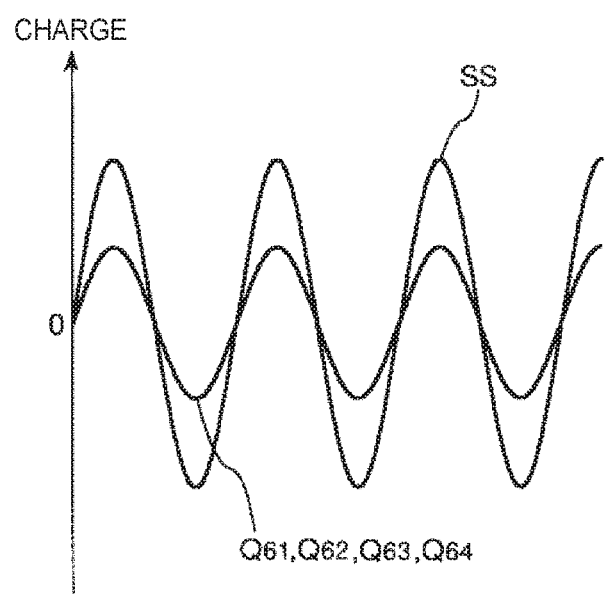
FIG. 21B is a diagram showing the detection signal in the detection vibration mode.

FIG. 18 is a cross-sectional view showing a gyro element (an angular velocity detection element) according to a fifth embodiment of the invention. FIG. 19 is a diagram showing the drive vibration mode of the gyro element shown in FIG. 18. FIG. 20A is a schematic diagram showing the drive vibration mode, and FIG. 20B is a schematic diagram showing the detection vibration mode. FIG. 21A is a diagram showing the detection signal in the drive vibration mode, and FIG. 21B is a diagram showing the detection signal in the detection vibration mode.

Hereinafter, the fifth embodiment will be described mainly focusing on the differences from the embodiments described above, and the explanation of substantially the same matters will be omitted.

The fifth embodiment is substantially the same as the fourth embodiment described above except the point that the directions of the driving piezoelectric elements and the detecting piezoelectric element are different from each other. It should be noted that in FIGS. 18, 19, 20A, 20B, 21A, and 21B, the constituents substantially identical to those of the embodiments described above are denoted by the same reference symbols.

As shown in FIG. 18, in the gyro element 1 according to the present embodiment, the arrangement of the signal electrode and the ground electrode of each of the driving piezoelectric elements 33, 34, 35, and 36, and the detecting piezoelectric elements 62, 63 disposed on the vibrating arms 23, 24 is opposite to that of the fourth embodiment described above.

Therefore, the gyro element 1 according to the present embodiment vibrates in the drive vibration mode shown in FIGS. 19 and 20A. Specifically, the vibrating arms 22, 24 vibrate in the X-axis in-phase mode, and the vibrating arms 23, 25 vibrate in the X-axis in-phase mode, and the vibrating arms 22, 24 and the vibrating arms 23, 25 vibrate in the X-axis inverse-phase mode. Further, coupling to such vibrations in the X-axis direction, the vibrating arms 22, 23 vibrate in the Z-axis in-phase mode, and the vibrating arms 24, 25 vibrate in the Z-axis in-phase mode, and the vibrating arms 22, 23 and the vibrating arms 24, 25 vibrate in the Z-axis inverse-phase mode. In such a drive vibration mode, the vibrations in the X-axis direction are canceled out, and at the same time, the charges $Q_{61}$, $Q_{63}$ generated from the detecting piezoelectric elements 61, 63 and the charges $Q_{62}$, $Q_{64}$ generated from the detecting piezoelectric elements 62, 64 are canceled out to make the detection signal SS approximately 0 as shown in FIG. 21A.

When the angular velocity ωy around the Y axis is applied to the gyro element 1 in the state of the drive vibration mode, the Coriolis force acts to newly excite the vibration in the detection vibration mode as shown in FIG. 20B. Specifically, the vibrating arms 22, 24 vibrate in the Z-axis in-phase mode, and the vibrating arms 23, 25 vibrate in the Z-axis in-phase mode, and the vibrating arms 22, 24 and the vibrating arms 23, 25 vibrate in the Z-axis inverse-phase mode. When such a detection vibration mode is excited, the charges $Q_{61}$, $Q_{62}$, $Q_{63}$, and $Q_{64}$ the same in phase are generated from the detecting piezoelectric elements 61, 62, 63, and 64, and the detection signal SS obtained by adding the charges $Q_{61}$, $Q_{62}$, $Q_{63}$, and $Q_{64}$ to each other is taken out between the detection signal terminal 53 and the detection ground terminal 54 as shown in FIG. 21B. Then, the angular velocity ωy is obtained based on the magnitude of the detection signal SS thus taken out.

In such a configuration, since it is possible to obtain the detection signal SS obtained by adding the charges $Q_{61}$, $Q_{62}$, $Q_{63}$, and $Q_{64}$ respectively generated from the four detecting piezoelectric elements 61, 62, 63, and 64 to each other, the intensity of the detection signal SS can be increased compared to, for example, the case of the first embodiment described above, and the detection accuracy can be improved accordingly. Further, since the vibrations in the X-axis direction and the Z-axis direction of the vibrating arms 22, 23, 24, and 25 can be canceled out in the drive vibration mode and the detection vibration mode, the vibration leakage of the gyro element 1 can be reduced, and thus, the detection accuracy is further improved.

According also to such a fifth embodiment as described above, substantially the same advantages as in the first embodiment described above can be exerted.

Sixth Embodiment

Figure 22:
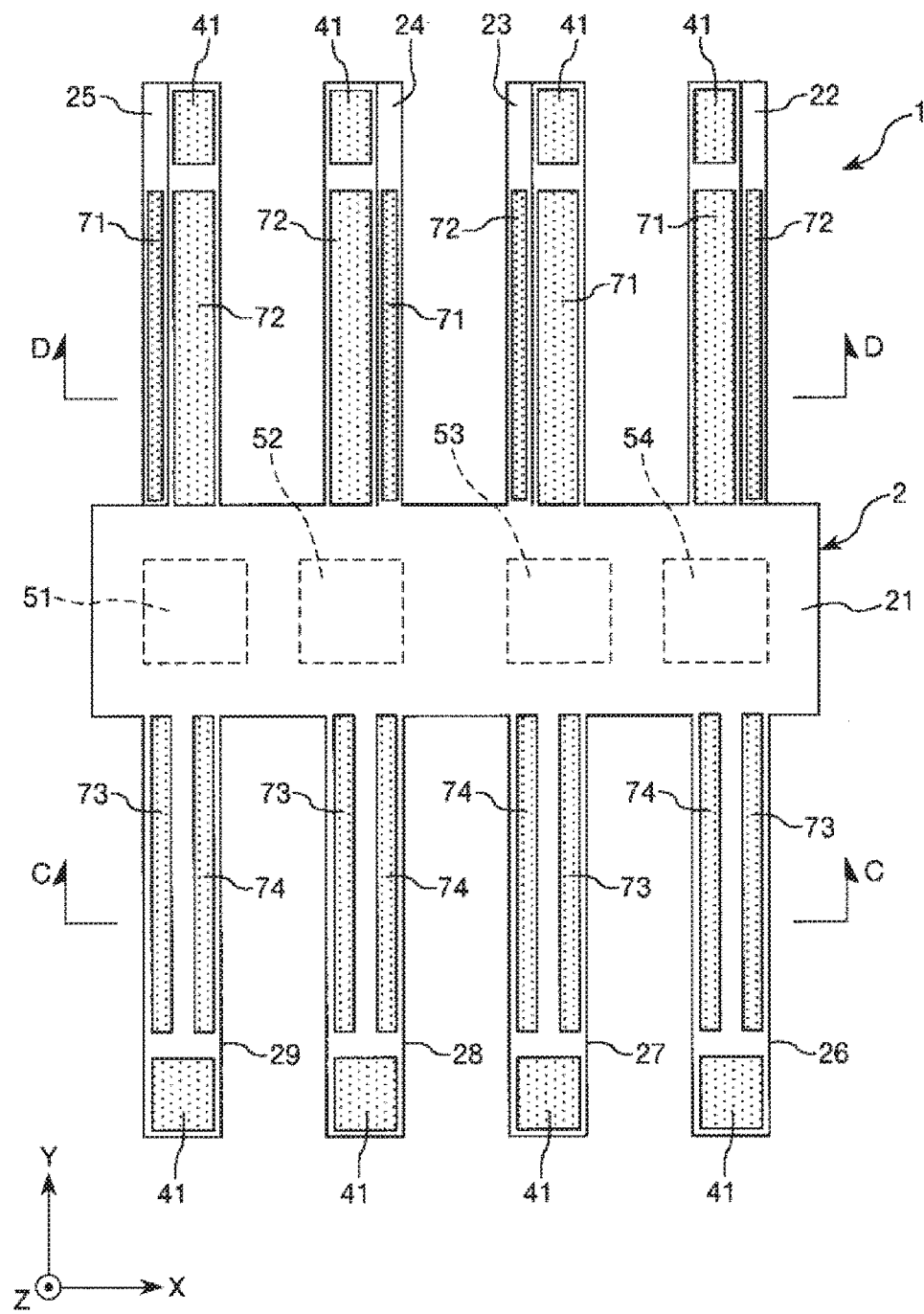
FIG. 22 is a plan view showing a gyro element (an angular velocity detection element) according to a sixth embodiment of the invention.
Figures 23A, 23B:
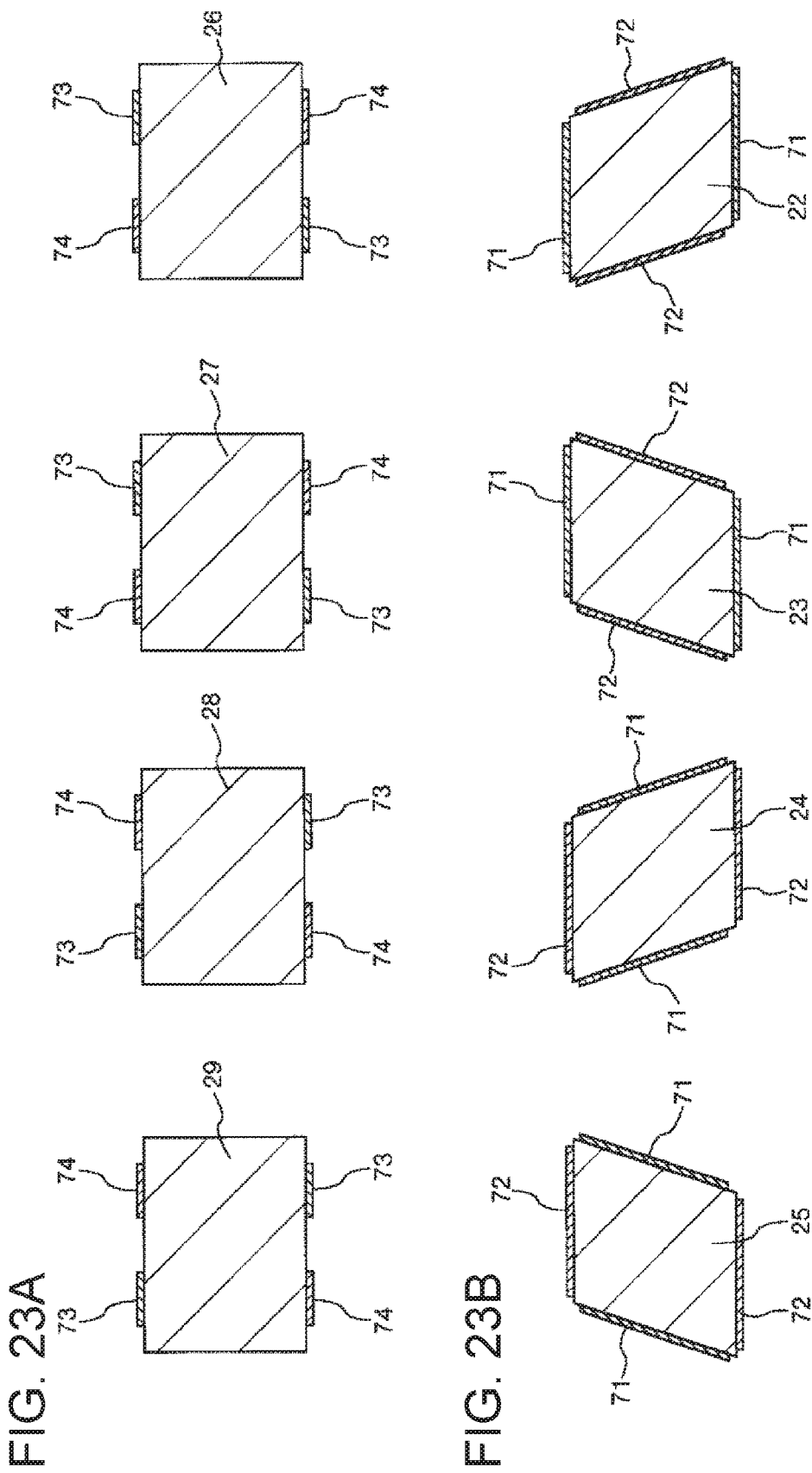
FIG. 23A is a cross-sectional view along the line C-C in FIG. 22.
FIG. 23B is a cross-sectional view along the line D-D in FIG. 22.
Figure 25A:
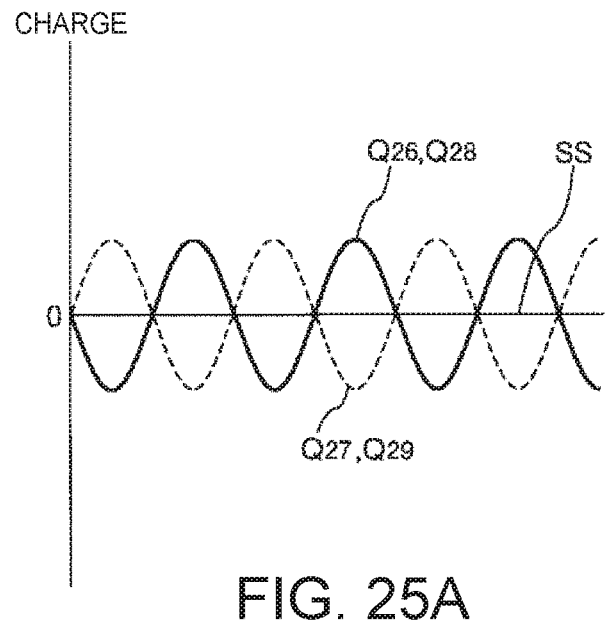
FIG. 25A is a diagram showing the detection signal in the drive vibration mode.
Figure 25B:
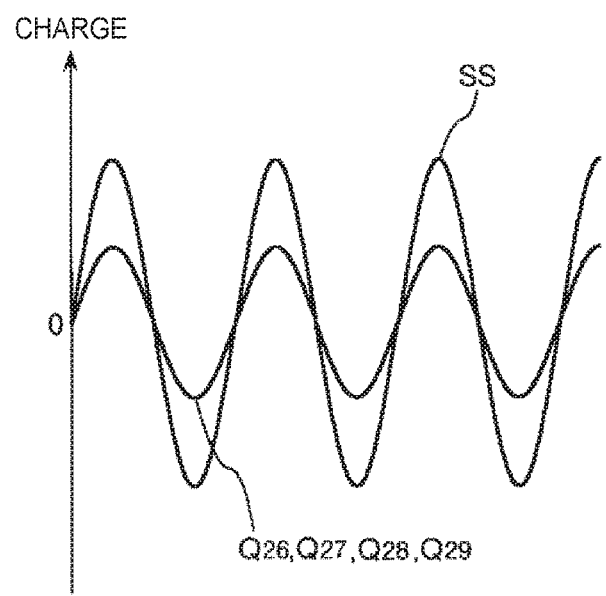
FIG. 25B is a diagram showing the detection signal in the detection vibration mode.

FIG. 22 is a plan view showing a gyro element (an angular velocity detection element) according to a sixth embodiment of the invention. FIG. 23A is a cross-sectional view along the line C-C in FIG. 22, and FIG. 23B is a cross-sectional view along the line D-D in FIG. 22. FIG. 24A is a schematic diagram showing the drive vibration mode, and FIG. 24B is a schematic diagram showing the detection vibration mode. FIG. 25A is a diagram showing the detection signal in the drive vibration mode, and FIG. 25B is a diagram showing the detection signal in the detection vibration mode.

Hereinafter, the sixth embodiment will be described mainly focusing on the differences from the embodiments described above, and the explanation of substantially the same matters will be omitted.

The sixth embodiment is substantially the same as the third embodiment described above except the point that the material of the vibrator substrate is different, and the configuration of the drive section and the detection section is different accordingly. It should be noted that in FIGS. 22, 23, 24A, 24B, 25A, and 25B, the constituents substantially identical to those of the embodiments described above are denoted by the same reference symbols.

In the gyro element 1 according to the present embodiment, the vibrator substrate 2 is formed of a piezoelectric material. As the piezoelectric material constituting the vibrator substrate 2, there can be used a variety of types of piezoelectric material such as quartz crystal, lithium niobate ($LiNbO_3$), lithium tantalate ($LiTaO_3$), lead zirconium titanate (PZT), lithium tetraborate ($Li_2B_4O_7$), or langasite crystal ($La_3Ga_5SiO_{14}$). It should be noted that among these materials, the quartz crystal is preferably used as the constituent material of the vibrator substrate 2. By using the quartz crystal, the gyro element 1 having superior frequency-temperature characteristics compared to other materials can be obtained. Further, it is possible to form the vibrator substrate 2 with high dimensional accuracy by wet-etching. Therefore, the case in which the vibrator substrate 2 is constituted by quartz crystal will hereinafter be described for the sake of convenience of explanation.

As shown in FIG. 22, the vibrator substrate 2 has a plate-like shape having a spread in the X-Y plane defined by the X axis (an electric axis) and the Y axis (a mechanical axis) as the crystal axes of the quartz crystal, and a thickness in the Z-axis (an optical axis) direction. In other words, the vibrator substrate 2 is formed of a Z-cut quartz crystal plate. It should be noted that although the Z axis coincides with the thickness direction of the vibrator substrate 2 in the present embodiment, the invention is not limited to this configuration, but it is possible to slightly (e.g., within roughly ±15°) tilt the Z axis with respect to the thickness direction of the vibrator substrate 2 from the viewpoint of reducing the frequency-temperature variation in the vicinity of the room temperature.

Such a vibrator substrate 2 has the base section 21, the vibrating arms 22, 23, 24, and 25 as four drive arms extending toward the +Y axis side from the end portion on the +Y axis side of the base section 21, and vibrating arms 26, 27, 28, and 29 as four detection arms extending toward the −Y axis side from the end portion on the −Y axis side of the base section 21.

The base section 21 spreads in the X-Y plane, and has a plate-like shape having a thickness in the Z-axis direction. On the lower surface of such a base section 21, there are disposed the drive signal terminal 51, the drive ground terminal 52, the detection signal terminal 53, and the detection ground terminal 54 arranged in the X-axis direction.

As shown in FIG. 23A, the four vibrating arms 26, 27, 28, and 29 are each formed to have a roughly rectangular cross-sectional shape. Further, on each of the upper and lower surfaces of each of these vibrating arms 26, 27, 28, and 29, there are disposed a detection signal electrode 73 and a detection ground electrode 74 as the detection section. Further, these detection signal electrodes 73 are connected to the detection signal terminal 53 via wiring not shown, and the detection ground electrodes 74 are connected to the detection ground terminal 54 via wiring not shown. Further, on the tip portion of each of the vibrating arms 26, 27, 28, and 29, there is disposed the mass adjustment film 41, and by removing, for example, a part of the mass adjustment film 41, the frequency and the amplitude of each of the vibrating arms 26, 27, 28, and 29 can be adjusted.

As shown in FIG. 23B, the four vibrating arms 22, 23, 24, and 25 are each formed to have a roughly parallelogram cross-sectional shape. Further, the parallelograms as the cross-sectional shapes of the vibrating arms 22, 24 are tilted in the same direction as each other, and the parallelograms as the cross-sectional shapes of the vibrating arms 23, 25 are tilted in the same direction as each other, and in the opposite direction to that of the vibrating arms 22, 24. Further, these vibrating arms 22, 23, 24, and 25 are each provided with drive signal electrodes 71 and drive ground electrodes 72 as the drive section.

The drive signal electrodes 71 are disposed on both principal surfaces (the upper and lower surfaces) of each of the vibrating arms 22, 23, and both side surfaces of each of the vibrating arms 24, 25, and the drive ground electrodes 72 are disposed on both side surfaces of each of the vibrating arms 22, 23, and both principal surfaces of each of the vibrating arms 24, 25. Further, these drive signal electrodes 71 are connected to the drive signal terminal 51 via wiring not shown, and the drive ground electrodes 72 are connected to the drive ground terminal 52 via wiring not shown.

Therefore, when applying an alternating voltage with a predetermined frequency between the drive signal electrodes 71 and the drive ground electrodes 72 via the drive signal terminal 51 and the drive ground terminal 52, the gyro element 1 vibrates in the drive vibration mode shown in FIG. 24A. Specifically, the vibrating arms 22, 23 vibrate in the X-axis in-phase mode, and the vibrating arms 24, 25 vibrate in the X-axis in-phase mode, and the vibrating arms 22, 23 and the vibrating arms 24, 25 vibrate in the X-axis inverse-phase mode. Further, coupling to such vibrations in the X-axis direction, the vibrating arms 22, 25 vibrate in the Z-axis in-phase mode, and the vibrating arms 23, 24 vibrate in the Z-axis in-phase mode, and the vibrating arms 22, 25 and the vibrating arms 23, 24 vibrate in the Z-axis inverse-phase mode. Further, under the influence of the vibrations of the vibrating arms 22, 23, 24, and 25, the vibrating arms 26, 27, 28, and 29 vibrate in the X-axis direction and the Z-axis direction in the phases reverse to those of the vibrating arms 22, 23, 24, and 25. In such a drive vibration mode, the vibrations in the X-axis direction are canceled out. Further, as shown in FIG. 25A, since charges $Q_{26}$, $Q_{28}$ from the vibrating arms 26, 28 and charges $Q_{27}$, $Q_{29}$ from the vibrating arms 27, 29 are generated in the respective phases opposite to each other, these charges $Q_{26}$, $Q_{27}$, $Q_{28}$, and $Q_{29}$ are canceled out to make the detection signal SS approximately 0.

When the angular velocity ωy around the Y axis is applied to the gyro element 1 in the state of the drive vibration mode, the Coriolis force acts to newly excite the vibration in the detection vibration mode as shown in FIG. 24B. Specifically, the vibrating arms 22, 23 vibrate in the Z-axis in-phase mode, and the vibrating arms 24, 25 vibrate in the Z-axis in-phase mode, and the vibrating arms 22, 23 and the vibrating arms 24, 25 vibrate in the Z-axis inverse-phase mode. Further, the vibrating arms 26, 27 vibrate in the Z-axis in-phase mode, and the vibrating arms 28, 29 vibrate in the Z-axis in-phase mode, and the vibrating arms 26, 27 and the vibrating arms 28, 29 vibrate in the Z-axis inverse-phase mode. In such a detection vibration mode, since the charges $Q_{26}$, $Q_{27}$, $Q_{28}$, and $Q_{29}$ the same in phase are generated from the vibrating arms 26, 27, 28, and 29, the detection signal SS obtained by adding the charges $Q_{26}$, $Q_{22}$, $Q_{28}$, and $Q_{29}$ to each other is taken out between the detection signal terminal 53 and the detection ground terminal 54 as shown in FIG. 25B. Then, the angular velocity ωy is obtained based on the magnitude of the detection signal SS thus taken out.

According to such a configuration, since it is possible to obtain the detection signal SS obtained by adding the charges $Q_{26}$, $Q_{22}$, $Q_{28}$, and $Q_{29}$ generated from the four vibrating arms 26, 27, 28, and 29 to each other, the intensity of the detection signal SS can be increased compared to, for example, the case of the first embodiment described above, and the detection accuracy can be improved accordingly. Further, since the vibrations in the X-axis direction and the Z-axis direction of the vibrating arms 22 through 25, and the vibrating arms 26 through 29 can be canceled out in the drive vibration mode and the detection vibration mode, the vibration leakage of the gyro element 1 can effectively be reduced, and thus, the detection accuracy is further improved.

According also to such a sixth embodiment as described above, substantially the same advantages as in the first embodiment described above can be exerted.

2. Angular Velocity Detection Device

Then, an angular velocity detection device using the gyro element 1 will be described.

Figure 26A:
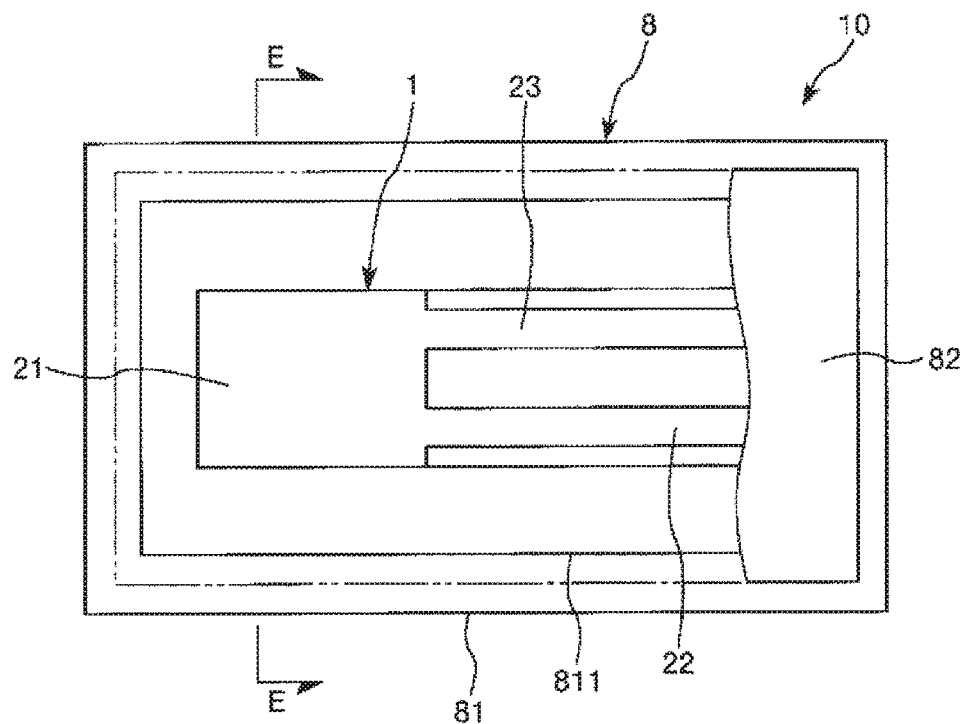
Figure 26B:
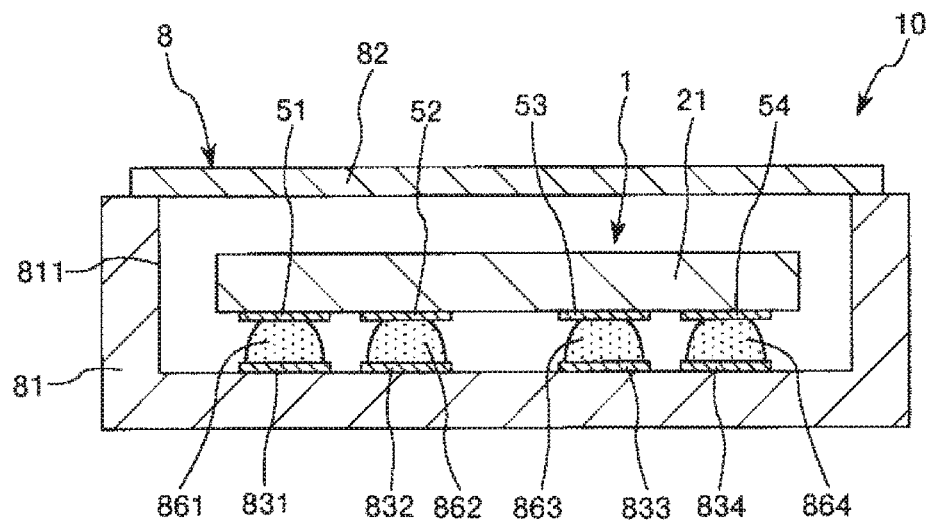

FIGS. 26A and 26B are diagrams showing an angular velocity detection device as a preferred embodiment of the invention, wherein FIG. 26A is a plan view, and FIG. 26B is a cross-sectional view along the line E-E in FIG. 26A.

As shown in FIGS. 26A and 26B, the angular velocity detection device 10 has the gyro element 1, and a package 8 for housing the gyro element 1.

The package 8 has a base 81 having a box-like shape provided with a recessed section 811, and a lid 82 having a plate-like shape and bonded to the base 81 so as to block the opening of the recessed section 811. Further, the gyro element 1 is housed in a housing space formed by the recessed section 811 blocked by the lid 82. The housing space can be kept in a reduced-pressure state, or filled with an inert gas such as nitrogen, helium, or argon.

The constituent material of the base 81 is not particularly limited, but a variety of types of ceramics such as aluminum oxide or a variety of types of glass materials can be used therefor. Further, the constituent material of the lid 82 is not particularly limited, but a member with a linear expansion coefficient similar to that of the constituent material of the base 81 is preferable. For example, if the ceramics described above is used as the constituent material of the base 81, an alloy such as kovar is preferably used. It should be noted that bonding between the base 81 and the lid 82 is not particularly limited, but it is possible to adopt bonding with, for example, an adhesive or a brazing material.

Further, on the bottom surface of the recessed section 811, there are formed connection terminals 831, 832, 833, and 834. These connection terminals 831 through 834 are each drawn to the lower surface (the outer peripheral surface of the package 8) of the base 81 using through electrodes (through holes) or the like not shown provided to the base 81.

In the gyro element 1, the base section 21 is fixed to the bottom surface of the recessed section 811 with electrically-conductive adhesives 861, 862, 863, and 864. Further, the drive signal terminal 51 and the connection terminal 831 are electrically connected to each other via the electrically-conductive adhesive 861, the drive ground terminal 52 and the connection terminal 832 are electrically connected to each other via the electrically-conductive adhesive 862, the detection signal terminal 53 and the connection terminal 833 are electrically connected to each other via the electrically-conductive adhesive 863, and the detection ground terminal 54 and the connection terminal 834 are electrically connected to each other via the electrically-conductive adhesive 864. The electrically-conductive adhesives 861 through 864 are not particularly limited providing an electrically-conductive property and an adhesive property are provided, and there can be used a material obtained by dispersing electrically-conductive filler such as silver particles in an adhesive such as a silicone adhesive, an epoxy adhesive, an acrylic adhesive, a polyimide adhesive, or a bismaleimide adhesive.

3. Gyro Sensor

Then, a gyro sensor using the gyro element 1 will be described.

Figure 27:
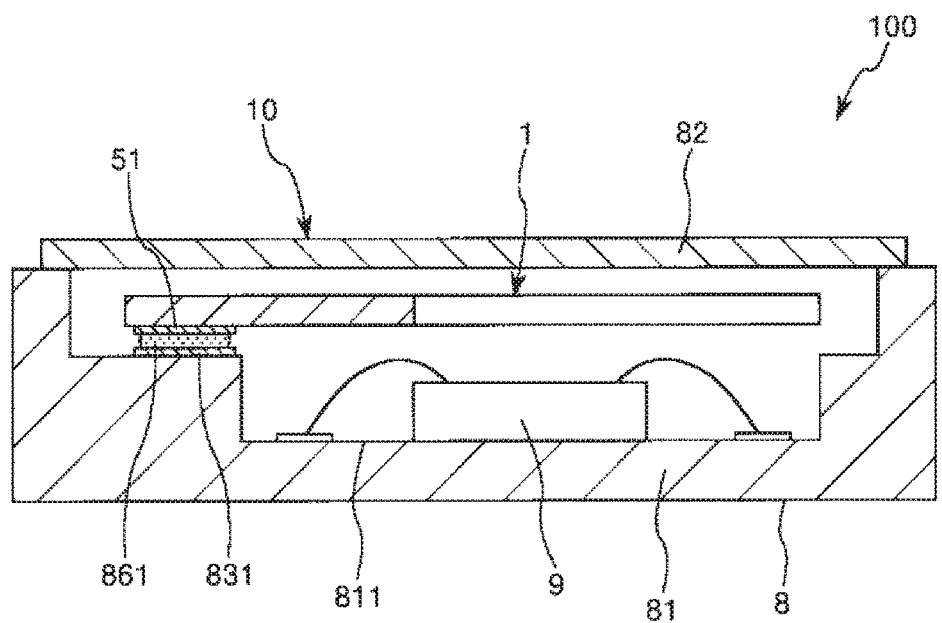
FIG. 27 is a cross-sectional view showing a gyro sensor as a preferred embodiment of the invention.

FIG. 27 is a cross-sectional view showing the gyro sensor as a preferred embodiment of the invention.

As shown in FIG. 27, the gyro sensor 100 has an angular velocity detection device 10 and an IC chip 9. The IC chip 9 is fixed to the bottom surface of the recessed section 811 with the brazing material or the like. The IC chip 9 is electrically connected to the connection terminals 831 through 834 with electrically-conductive wires (it should be noted that in FIGS. 26A and 26B, only the connection terminal 831 is illustrated). Such an IC chip 9 has a drive circuit for making the gyro element 1 perform the drive vibration, a detection circuit for detecting the detection vibration caused in the gyro element 1 in response to the angular velocity applied thereto, and so on. It should be noted that although in the present embodiment, the IC chip 9 is disposed inside the package 8, it is also possible for the IC chip 9 to be disposed outside the package 8.

4. Electronic Apparatus

Then, an electronic apparatus to which the gyro element 1 is applied will be described in detail with reference to FIGS. 28 through 30.

Figure 28:
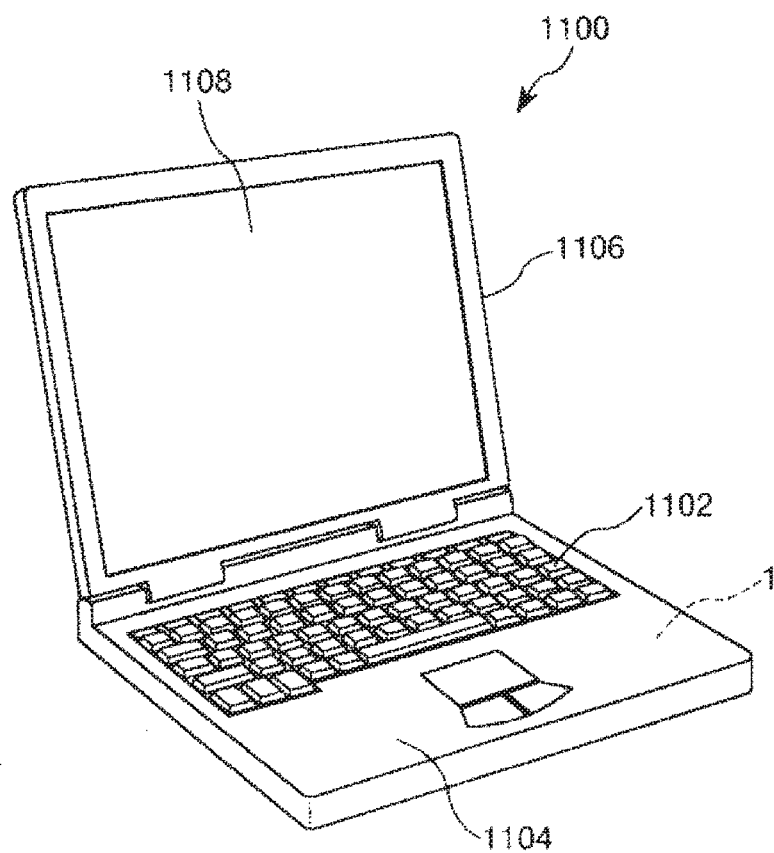
FIG. 28 is a perspective view showing a configuration of a mobile type (or laptop type) personal computer as the electronic apparatus according to the invention.

FIG. 28 is a perspective view showing a configuration of a mobile type (or laptop type) personal computer as the electronic apparatus according to the invention.

In the drawing, the personal computer 1100 includes a main body section 1104 provided with a keyboard 1102, and a display unit 1106 provided with a display section 1108, and the display unit 1106 is pivotally supported with respect to the main body section 1104 via a hinge structure. Such a personal computer 1100 incorporates the gyro element 1 functioning as an angular velocity sensor (a gyro sensor).

Figure 29:
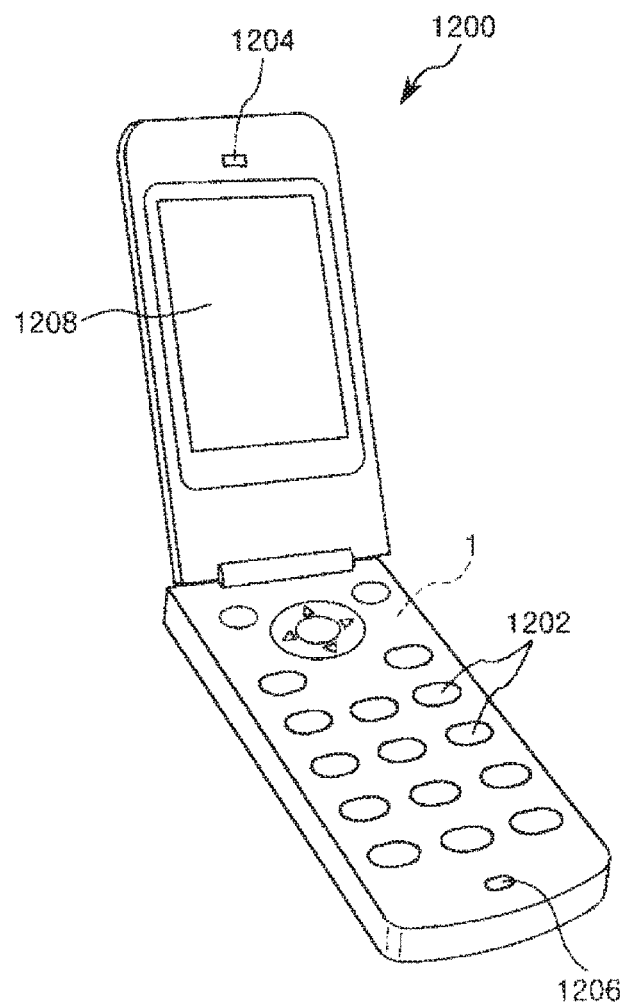
FIG. 29 is a perspective view showing a configuration of a cellular phone (including a smartphone, PHS and so on) as the electronic apparatus according to the invention.

FIG. 29 is a perspective view showing a configuration of a cellular phone (including a smartphone, PHS and so on) as the electronic apparatus according to the invention.

In this drawing, the cellular phone 1200 is provided with a plurality of operation buttons 1202, an ear piece 1204, and a mouthpiece 1206, and a display section 1208 is disposed between the operation buttons 1202 and the ear piece 1204. Such a cellular phone 1200 incorporates the gyro element 1 functioning as an angular velocity sensor (a gyro sensor).

Figure 30:
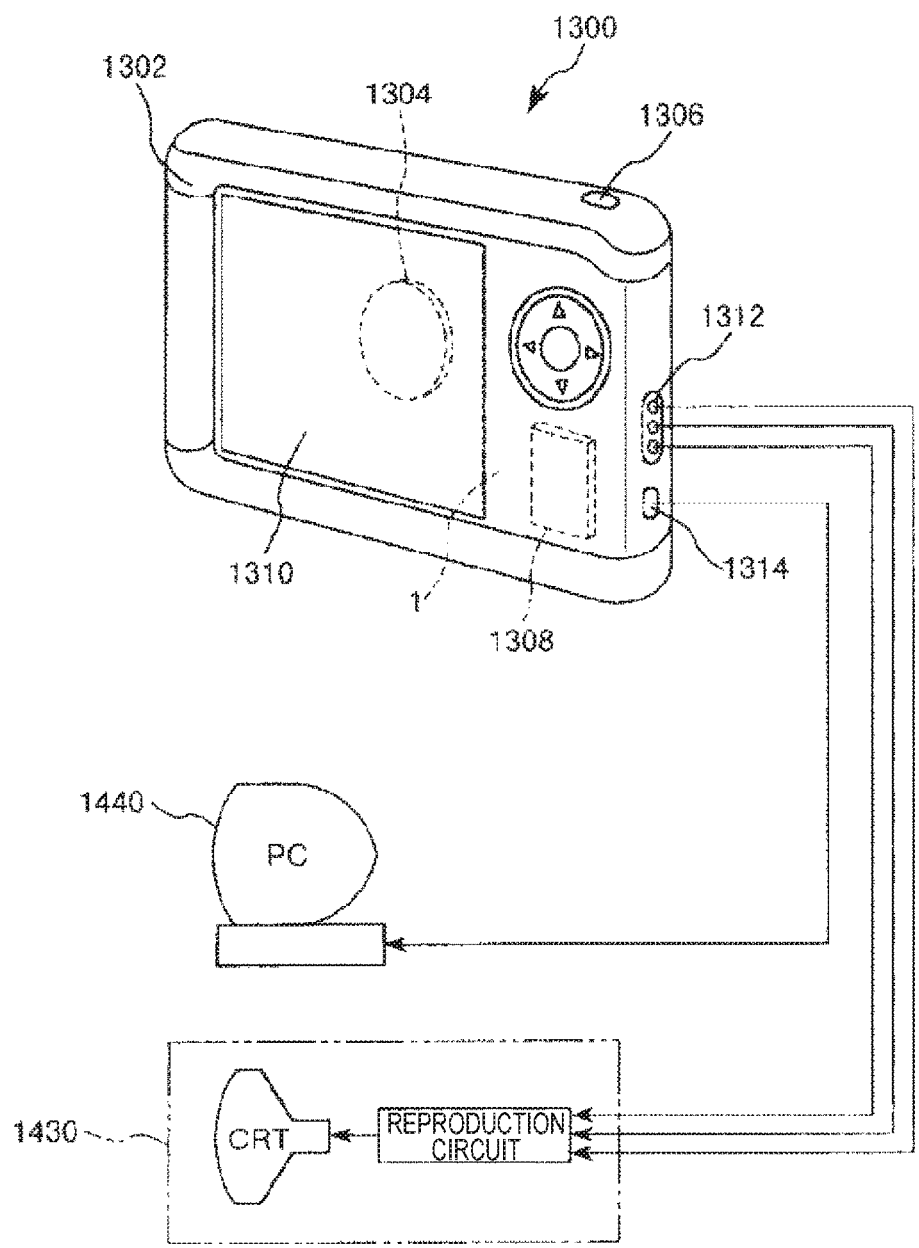
FIG. 30 is a perspective view showing a configuration of a digital still camera as the electronic apparatus according to the invention.

FIG. 30 is a perspective view showing a configuration of a digital still camera as the electronic apparatus according to the invention. It should be noted that the connection with external equipment is also shown briefly in this drawing.

The digital still camera 1300 performs photoelectric conversion on an optical image of an object using an imaging element such as CCD (Charge Coupled Device) to thereby generate an imaging signal (an image signal). The case (body) 1302 of the digital still camera 1300 is provided with a display section 1310 disposed on the back surface thereof to have a configuration of performing display in accordance with the imaging signal from the CCD, wherein the display section 1310 functions as a viewfinder for displaying the object as an electronic image.

Further, the front surface (the back side in the drawing) of the case 1302 is provided with a light receiving unit 1304 including an optical lens (an imaging optical system), the CCD, and so on.

When the photographer checks an object image displayed on the display section 1310, and then holds down a shutter button 1306, the imaging signal from the CCD at that moment is transferred to and stored in a memory device 1308.

Further, the digital still camera 1300 is provided with video signal output terminals 1312 and an input/output terminal 1314 for data communication disposed on a side surface of the case 1302. Further, as shown in the drawing, a television monitor 1430 and a personal computer 1440 are respectively connected to the video signal output terminals 1312 and the input-output terminal 1314 for data communication according to needs. Further, there is adopted the configuration in which the imaging signal stored in the memory device 1308 is output to the television monitor 1430 and the personal computer 1440 in accordance with a predetermined operation.

Such a digital still camera 1300 incorporates the gyro element 1 functioning as an angular velocity sensor (a gyro sensor).

The electronic apparatuses described above are each provided with the gyro element 1, and can therefore exert high reliability.

It should be noted that, as the electronic apparatus according to the invention, there can be cited, for example, a smartphone, a tablet terminal, an inkjet ejection device (e.g., an inkjet printer), a laptop personal computer, a television set, a video camera, a video cassette recorder, a car navigation system, a pager, a personal digital assistance (including one with communication function), an electronic dictionary, an electric calculator, a computerized game machine, a word processor, a workstation, a video phone, a security video monitor, a pair of electronic binoculars, a POS terminal, a medical device (e.g., an electronic thermometer, an electronic manometer, an electronic blood sugar meter, an electrocardiogram measurement instrument, an ultrasonograph, and an electronic endoscope), a fish detector, various types of measurement instruments, various types of gauges (e.g., gauges for a vehicle, an aircraft, or a ship), and a flight simulator, besides the personal computer (the mobile personal computer) shown in FIG. 28, the cellular phone shown in FIG. 29, and the digital still camera shown in FIG. 30.

5. Moving Object

Then, a moving object to which the gyro element 1 shown in FIG. 1 is applied will be described in detail with reference to FIG. 31.

Figure 31:
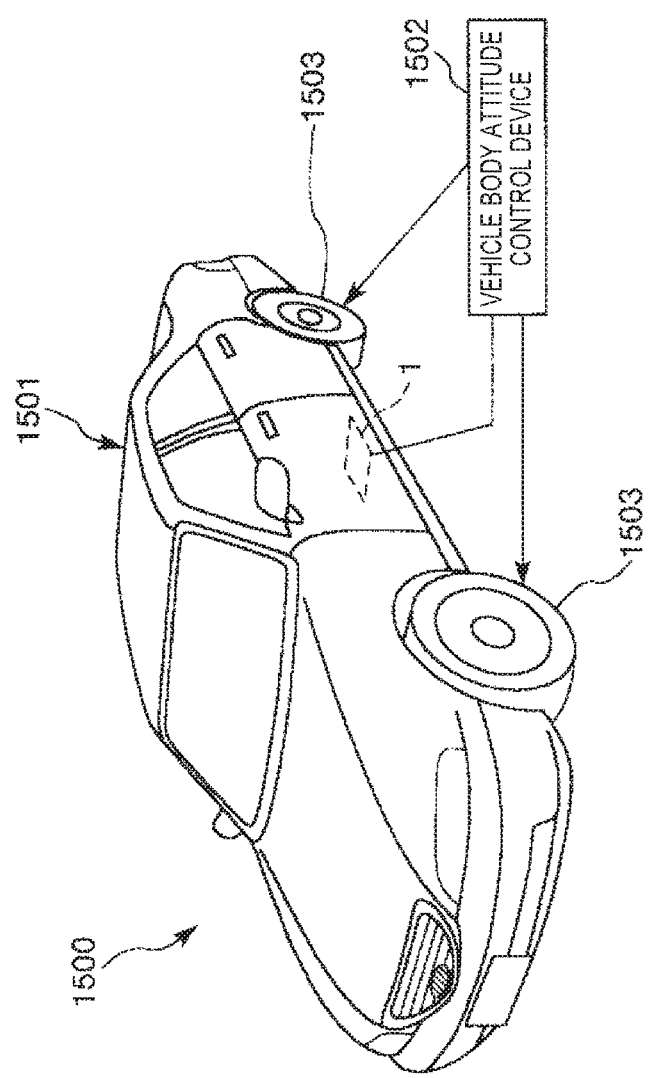
FIG. 31 is a perspective view showing a configuration of a vehicle as a moving object according to the invention.

FIG. 31 is a perspective view showing a configuration of a vehicle as a moving object according to the invention.

The vehicle 1500 incorporates the gyro element 1 functioning as the angular velocity sensor (the gyro sensor), and the attitude of a vehicle body 1501 can be detected using the gyro element 1. The detection signal of the gyro element 1 is supplied to the vehicle body attitude control device 1502, and the vehicle body attitude control device 1502 detects the attitude of the vehicle body 1501 based on the detection signal, and it is possible to control the stiffness of the suspension or control the brake of each of wheels 1503 in accordance with the detection result. Besides the above, such posture control as described above can be used for a two-legged robot and a radio control helicopter. As described above, in realizing the posture control of a variety of types of moving objects, the gyro element 1 is incorporated.

Although the angular velocity detection element, the angular velocity detection device, the electronic apparatus, and the moving object according to the invention are described based on the embodiments shown in the accompanying drawings, the invention is not limited to these embodiments, but the constituents of each of the sections can be replaced with those having an identical function and an arbitrary configuration. Further, it is also possible to add any other constituents to the invention. Further, the invention can be a combination of any two or more configurations (features) of the embodiments described above.

The entire disclosure of Japanese Patent Application No. 2015-059147, filed Mar. 23, 2015 is expressly incorporated by reference herein.

What is claimed is:

1. An angular velocity detection element comprising:
a base having a first base side, the base extending along a first plane;
first and second vibrating arms connected to the base, each of the first and second vibrating arms extending from the first base side in a first direction along the first plane, the first and second vibrating arms having first and second thicknesses, respectively, in a thickness direction perpendicular to the first direction, the first and second vibrating arms being configured to flexurally vibrate in a drive vibration mode;
a drive member provided to each of the first and second vibrating arms, the drive member being configured to make each of the first and second vibrating arms flexurally vibrate in the drive vibration mode; and
first and second detection members provided to the first and second vibrating arms, respectively, each of the first and second detection members being configured to detect an angular velocity around a detection axis,
wherein when the first and second vibrating arms flexurally vibrate in the drive vibration mode, the first and second vibrating arms move along a same direction along the first plane and move in an opposite direction along the thickness direction,
wherein when the first and second vibrating arms flexurally vibrate in the drive vibration mode without being applied the angular velocity thereto, the first and second detection members generate first and second signals, respectively, and the first and second signals have opposite phases to each other, and
when the first and second vibrating arms flexurally vibrate in the drive vibration mode while the angular velocity is applied to the first and second vibrating arms, the first and second detection members generate third and fourth signals, respectively, and the third and fourth signals have same phases to each other.

2. The angular velocity detection element according to claim 1, wherein
the first and second vibrating arms are tilted along the first plane so that a distance between the first and second vibrating arms increases toward tips of the first and second vibrating arms.

3. An angular velocity detection device comprising:
the angular velocity detection element according to claim 2; and
a package adapted to house the angular velocity detection element.

4. A moving object comprising:
the angular velocity detection element according to claim 2; and
a movable body that houses the angular velocity detection element.

5. The angular velocity detection element according to claim 1, further comprising:
third and fourth vibrating arms connected to the base, each of the third and fourth vibrating arms extending from the first base side in the first direction along the first plane, the third and fourth vibrating arms having third and fourth thicknesses, respectively, in the thickness direction, the third and fourth vibrating arms being configured to flexurally vibrate in the drive vibration mode,
wherein when the third and fourth vibrating arms flexurally vibrate in the drive vibration mode, the third and fourth vibrating arms move along a same direction along the first plane and move in an opposite direction along the thickness direction,
when the first, second, third, and fourth vibrating arms flexurally vibrate in the drive vibration mode, the first and third vibrating arms move in an opposite direction along the first plane, and
when the first, second, third, and fourth vibrating arms flexurally vibrate in the drive vibration mode, the second and fourth vibrating arms move in an opposite direction along the first plane.

6. The angular velocity detection element according to claim 5, wherein
when the first, second, third, and fourth vibrating arms flexurally vibrate in the drive vibration mode, the first and third vibrating arms move in an opposite direction along the thickness direction, and
when the first, second, third, and fourth vibrating arms flexurally vibrate in the drive vibration mode, the second and fourth vibrating arms move in an opposite direction along the thickness direction.

7. An angular velocity detection device comprising:
the angular velocity detection element according to claim 6; and
a package adapted to house the angular velocity detection element.

8. A moving object comprising:
the angular velocity detection element according to claim 6; and
a movable body that houses the angular velocity detection element.

9. An angular velocity detection device comprising:
the angular velocity detection element according to claim 5; and
a package adapted to house the angular velocity detection element.

10. A moving object comprising:
the angular velocity detection element according to claim 5; and
a movable body that houses the angular velocity detection element.

11. The angular velocity detection element according to claim 1, wherein
the drive member includes a piezoelectric element disposed on each of the first and second vibrating arms.

12. An angular velocity detection device comprising:
the angular velocity detection element according to claim 11; and
a package adapted to house the angular velocity detection element.

13. The angular velocity detection element according to claim 1, wherein
each of the first and second detection members includes a piezoelectric element respectively disposed on the first and second vibrating arms.

14. An angular velocity detection device comprising:
the angular velocity detection element according to claim 1; and
a package adapted to house the angular velocity detection element.

15. A moving object comprising:
the angular velocity detection element according to claim 1; and
a movable body that houses the angular velocity detection element.

16. An angular velocity detection element comprising:
a base having first and second base sides opposite to each other, the base extending along a first plane;

first and second vibrating arms connected to the base, each of the first and second vibrating arms extending from the first base side in a first direction along the first plane, the first and second vibrating arms having first and second thicknesses, respectively, in a thickness direction perpendicular to the first direction, the first and second vibrating arms being configured to flexurally vibrate in a drive vibration mode;

third and fourth vibrating arms connected to the base, each of the third and fourth vibrating arms extending from the second base side in a second direction, which is opposite to the first direction, along the first plane, the third and fourth vibrating arms having third and fourth thicknesses, respectively, in the thickness direction;

a drive member provided to each of the first and second vibrating arms, the drive member being configured to make each of the first and second vibrating arms flexurally vibrate in the drive vibration mode; and first and second detection members provided to the third and fourth vibrating arms, respectively, each of the first and second detection members being configured to detect an angular velocity around a detection axis, wherein when the first and second vibrating arms flexurally vibrate in the drive vibration mode, the first and second vibrating arms move along a same direction along the first plane and move in an opposite direction along the thickness direction, wherein when the first and second vibrating arms flexurally vibrate in the drive vibration mode without being applied the angular velocity thereto, the first and second detection members generate first and second signals, respectively, and the first and second signals have opposite phases to each other, and when the first and second vibrating arms flexurally vibrate in the drive vibration mode while the angular velocity is applied to the first and second vibrating arms, the first and second detection members generate third and fourth signals, respectively, and the third and fourth signals have same phases to each other.

17. The angular velocity detection element according to claim 16, wherein each cross section along a second plane perpendicular to the first plane of the first and second vibrating arms is a parallelogram, and each cross section along the second plane of the third and fourth vibrating arms is a rectangle.

18. An angular velocity detection device comprising:

the angular velocity detection element according to claim 17; and a package adapted to house the angular velocity detection element.

19. An angular velocity detection device comprising:

the angular velocity detection element according to claim 16; and a package adapted to house the angular velocity detection element.

20. A moving object comprising:

the angular velocity detection element according to claim 16; and a movable body that houses the angular velocity detection element.

* * * * *